United States Patent
Yoneda et al.

(10) Patent No.: US 7,585,361 B2
(45) Date of Patent: Sep. 8, 2009

(54) PORPHYRAZINE COLORING MATTER, INK, INK SET AND COLORED PRODUCT

(75) Inventors: Takashi Yoneda, Kita-ku (JP); Yoshiaki Kawaida, Kita-ku (JP); Hiroyuki Tsukui, Fukuyama (JP); Takafumi Fujii, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/226,043

(22) PCT Filed: Apr. 5, 2007

(86) PCT No.: PCT/JP2007/057651

§ 371 (c)(1),
(2), (4) Date: Oct. 6, 2008

(87) PCT Pub. No.: WO2007/116933

PCT Pub. Date: Oct. 18, 2007

(65) Prior Publication Data
US 2009/0151599 A1    Jun. 18, 2009

(30) Foreign Application Priority Data
Apr. 7, 2006    (JP) .............................. 2006-105904

(51) Int. Cl.
C09D 11/02 (2006.01)
C07D 487/22 (2006.01)
B41J 2/01 (2006.01)

(52) U.S. Cl. ..................... 106/31.47; 540/126; 347/100

(58) Field of Classification Search .............. 106/31.47; 540/126; 347/100; 428/195.1
See application file for complete search history.

(56) References Cited

U.S. PATENT DOCUMENTS

| | | | |
|---|---|---|---|
| 6,238,827 B1* | 5/2001 | Nakazawa et al. ............. 430/7 |
| 7,097,701 B2* | 8/2006 | Tateishi et al. ............ 106/31.47 |
| 7,132,012 B2* | 11/2006 | Tateishi et al. ............ 106/31.47 |
| 7,270,701 B2* | 9/2007 | Jinnou et al. ............. 106/31.47 |
| 7,282,090 B2* | 10/2007 | Osumi et al. ............. 106/31.47 |
| 7,419,537 B2* | 9/2008 | Fujii et al. ............... 106/31.47 |
| 2002/0128249 A1* | 9/2002 | Cook .......................... 514/185 |
| 2006/0201382 A1* | 9/2006 | Ozawa et al. ............. 106/31.47 |
| 2006/0268086 A1* | 11/2006 | Kawakami et al. .......... 347/100 |
| 2008/0274286 A1* | 11/2008 | Yamashita et al. ....... 106/31.47 |
| 2009/0029120 A1* | 1/2009 | Fujii et al. ............... 428/195.1 |
| 2009/0047430 A1* | 2/2009 | Mori et al. .................. 347/100 |

FOREIGN PATENT DOCUMENTS

| | | |
|---|---|---|
| EP | 1 741 756 | 1/2007 |
| WO | 2005/021658 | 3/2005 |

OTHER PUBLICATIONS

Copy of International Search Report dated 7/10/07.

* cited by examiner

*Primary Examiner*—Helene Klemanski
(74) *Attorney, Agent, or Firm*—Nields, Lemack & Frame, LLC

(57) ABSTRACT

The present invention relates to a porphyrazine coloring matter represented by the following formula (1):

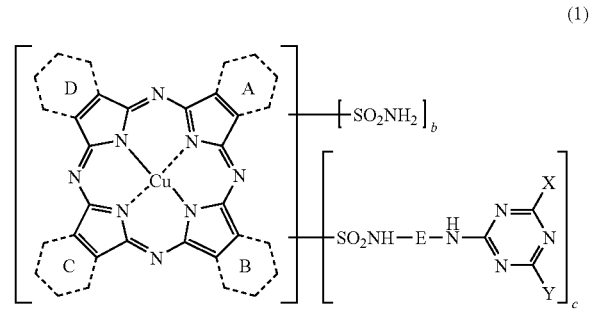

(wherein, A, B, C and D independently represents a 6-membered ring having aromaticity, at least one or more is a benzene ring, at least one or more contains a nitrogen-containing heteroaromatic ring; in addition, E represents alkylene and each of X and Y independently represents a substituted or unsubstituted anilino group or a substituted or unsubstituted naphthylamino group; and b is 0 to 2.9, c is 0.1 to 3 and the sum of b and c is 1 to 3) which has a good hue as a cyan ink, is excellent in light fastness, ozone fastness and moisture fastness, and does not cause bronze phenomenon, as well as is thus suitable for inkjet recording.

27 Claims, No Drawings

PORPHYRAZINE COLORING MATTER, INK, INK SET AND COLORED PRODUCT

TECHNICAL FIELD

The present invention relates to a novel porphyrazine coloring matter, an ink, an ink set, a method for inkjet recording using this ink or ink set, and a colored product thereby.

BACKGROUND ART

Recently, as image recording materials, materials to form color images are particularly in the main stream, and specifically inkjet recording materials, thermal transfer image recording materials, recording materials using an electrophotographic method, transfer silver halide photosensitive materials, printing inks, recording pens and the like are extensively used. In addition, color filters are used in LCD (liquid crystal display) and PDP (plasma display panel) for displays and in electronic parts such as CCD (imaging device) for photographing equipments. In these color image recording materials and color filters are used coloring matters (dyes and pigments) of 3 primary colors for so-called additive and subtractive color processes to reproduce and record full color images, but it is the case that there is no coloring matter which has absorption characteristics to realize preferable color reproduction areas and is durable to various use conditions, and therefore improvement is strongly desired.

The inkjet recording method has been rapidly spreading and also developing because its material cost is low, rapid recording is possible, noise in recording is less and also color recording is easy. The inkjet recording method includes a continuous method where ink droplets are continuously flown and an on-demand method where ink droplets are flown responding to an image information signal, and its discharging method includes a method where ink droplets are discharged by applying pressure with piezoelectric elements, a method where bubbles are generated in ink by heat to discharge ink droplets, a method using an ultrasonic wave, a method where ink droplets are absorbed and discharged by electrostatic force, or the like. In addition, examples of ink suitable for inkjet recording include a water-based ink, an oil-based ink, a solid (melting-type) ink and the like.

Required points on the coloring matter to be used in an ink suitable for such inkjet recording includes such points that its solubility or dispersibility to solvent is good, high density recording is possible, its hue is good in both monochrome and combination color, it is tolerant to light, heat, and active gases in the atmosphere (oxidizing gas such as NOx and ozone and other gases such as SOx), it has excellent fastness to water and chemicals, its fixation to record-receiving materials is good and therefore it hardly bleeds out, it is excellent in storage stability as ink, it has no toxicity, it is also inexpensively available, and so on. Particularly, strongly desired is a cyan coloring matter which has a good cyan hue, is excellent in light fastness (durability to light), ozone fastness (durability to ozone gas) and moisture fastness (durability under high humidity), and does not exhibit bronze phenomenon (also referred to as bronzing phenomenon). The bronze phenomenon means a glare phenomenon caused by that coloring matter is aggregated on the surface of glossy paper and the like due to association and aggregation of coloring matter or malabsorption of ink into media to give metallic luster. Occurrence of this phenomenon causes inferiority in all views of glossiness, print quality and print density.

Phthalocyanine and triphenylmethane skeletons are representative of the skeleton for water-soluble cyan coloring matters used for an ink suitable for inkjet recording. The typical phthalocyanine coloring matter which is the most widely reported and used includes phthalocyanine derivatives classified into from A to H below.

A: known phthalocyanine coloring matters such as C.I.Direct Blue 86, C.I.Direct Blue 87, C.I.Direct Blue 199, C.I.Acid Blue 249, C.I.Reactive Blue 71.

B: the phthalocyanine coloring matters described in Patent Literatures 1 to 3 and the like (for example, a mixture of Cu—Pc—$(SO_3Na)m(SO_2NH_2)n$: m+n=a number of 1 to 4).

C: the phthalocyanine coloring matters described in Patent Literature 4 and the like (for example, Cu—Pc—$(CO_2H)m(CONR_1R_2)n$: m+n=a number of 0 to 4).

D: the phthalocyanine coloring matters described in Patent Literature 5 and the like (for example, Cu—Pc—$(SO_3H)m(SO_2NR_1R_2)n$: m+n=a number of 0 to 4 and m≠0).

E: the phthalocyanine coloring matters described in Patent Literature 6 and the like (for example, Cu—Pc—$(SO_3H)_l(SO_2NH_2)m(SO_2NR_1R_2)n$: l+m+n=a number of 0 to 4).

F: the phthalocyanine coloring matters described in Patent Literature 7 and the like (for example, Cu—Pc—$(SO_2NR_1R_2)n$: n=a number of 1 to 5).

G: the phthalocyanine coloring matters described in Patent Literatures 8, 9, 12 and the like (the phthalocyanine compound where the substitution position of the substituent is controlled and the phthalocyanine coloring matter where a substituent is introduced at the β-position).

H: the benzo pyridoporphyrazine coloring matters having a pyridine ring and a benzene ring which are described in Patent Literatures 10, 13, 14 and the like.

The phthalocyanine coloring matter as typified by C.I.Direct Blue 86 or C.I.Direct Blue 199 used generally and widely at present has a characteristic of having excellent light fastness compared with magenta coloring matters and yellow coloring matters known in general. The phthalocyanine coloring matter is not very preferable as a cyan ink because it has a green tinged hue under acidic conditions. Therefore, when these coloring matters are used as a cyan ink, they are preferably used under neutral to alkaline conditions. However, although the ink is neutral to alkaline, it is possible that the hue of printed matter is largely changed when the record-receiving material to be used is an acidic paper.

In addition, when the phthalocyanine coloring matter is used as a cyan ink, the hue of printed matter is changed to be green tinged as well as color fading occurs due to oxidizing gases such as nitrogen oxide gas and ozone which are often raised as an environmental issue in recent years, resulting in that the print density is decreased.

On the other hand, the triphenylmethane coloring matter is good in hue, but very inferior in light fastness, ozone fastness and moisture fastness.

From here on, when the application field of inkjet recording is expanded and widely used for articles on exhibition of ads and the like, the coloring matter and ink to be used there will be more and more strongly required to have a good hue and be inexpensive as well as to be excellent in light fastness, fastness to active gases in the environment and moisture fastness because they will be more often exposed to light and active gases in the environment (oxidizing gases such as NOx, SOx and ozone, and the like). However, it is difficult to develop a cyan coloring matter (for example, phthalocyanine coloring matter) and a cyan ink satisfying these requirements at a high level. So far, Patent Literatures 3, 8 to 12, 14 and the like disclose the phthalocyanine coloring matters where active gas fastness is imparted, but any cyan coloring matter and cyan ink have yet to be obtained which satisfies all the quality of hue, light fastness, ozone fastness and moisture fastness, does not exhibit the bronze phenomenon, and also can be produced inexpensively. Therefore, the requirements of the market have not yet been satisfied enough.

[Patent Literature 1] JP S62-190273

[Patent Literature 2] JP H07-138511

[Patent Literature 3] JP 2002-105349

[Patent Literature 4] JP H05-171085

[Patent Literature 5] JP H10-140063

[Patent Literature 6] JP H11-515048

[Patent Literature 7] JP S59-22967

[Patent Literature 8] JP 2000-303009

[Patent Literature 9] JP 2002-249677

[Patent Literature 10] JP 2003-34758

[Patent Literature 11] JP 2002-80762

[Patent Literature 12] WO 2004087815

[Patent Literature 13] WO 2002034844

[Patent Literature 14] JP 2004-75986

DISCLOSURE OF THE INVENTION

Problems to be Solved by the Invention

The present invention has an object to solve the above problems and provide a novel porphyrazine coloring matter which has a good hue as a cyan ink, is excellent in light fastness, ozone fastness and moisture fastness, and does not exhibit bronze phenomenon; and also to provide an ink suitable for inkjet and an inkjet recording method, using said coloring matter.

Means of Solving the Problems

The inventors of the present invention have closely studied for a porphyrazine coloring matter which has a good hue and high light and ozone fastnesses, and does not exhibit bronze phenomenon, found out that using a certain porphyrazine coloring matter as a coloring matter for ink can solve the above problems, and completed the present invention. That is, the present invention relates to;

(1) A porphyrazine coloring matter represented by the following formula (1) or a salt thereof:

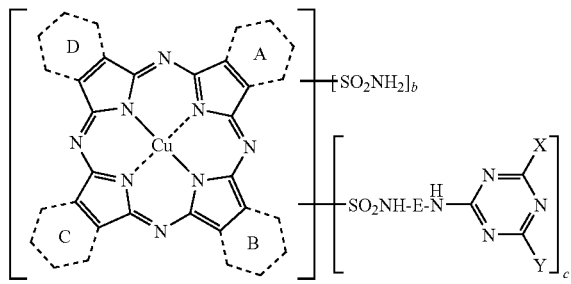

(1)

(wherein, A, B, C and D independently represent a 6-membered ring having aromaticity, at least one of them represents a benzene ring, and at least one of the rest represents a nitrogen-containing heteroaromatic ring; E represents alkylene; each of X and Y independently represents a substituted or unsubstituted anilino group or a substituted or unsubstituted naphthylamino group, said anilino group may have 0 to 4 substituents of one or more kinds selected from the group consisting of a sulfo group, a carboxy group, a phosphono group, a carbamoyl group, a sulfamoyl group, a ureide group, an alkyl group, an alkoxy group, an allyloxy group, a hydroxy group, a dialkylamino group, an alkylamino group, an arylamino group, an acetylamino group, a cyano group, a nitro group, a halogen atom and a heterocycle group, said naphthylamino group may have 0 to 4 substituents of one or more kinds selected from the group consisting of a sulfo group, a carboxy group, a ureide group, an alkyl group, an alkoxy group, a hydroxy group, a dialkylamino group, an alkylamino group, an arylamino group, an acetylamino group, a cyano group, a nitro group, a halogen atom and a heterocycle group, and at least one of X and Y is an anilino group or a naphthylamino group having a sulfo group or a carboxy group as a substituent; and b is 0 to 2.9, c is 0.1 to 3, and the sum of b and c is 1 to 3), (2) The porphyrazine coloring matter or the salt thereof according to (1) wherein the nitrogen-containing heteroaromatic ring corresponding to A, B, C or D is a pyridine ring or a pyrazine ring, (3) The porphyrazine coloring matter or the salt thereof according to (1) or (2), which is obtained by reacting a porphyrazine compound represented by the following formula (3) with an organic amine represented by the following formula (4) in the presence of ammonia:

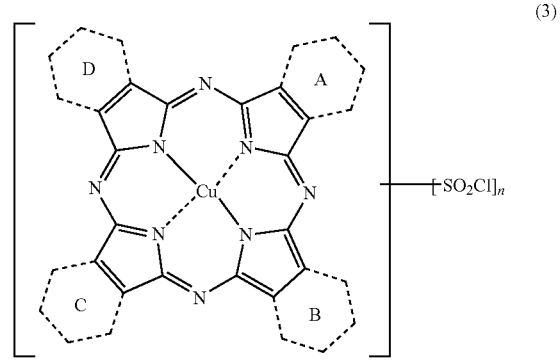

(3)

(wherein, A, B, C and D have the same meanings as in the formula (1) and n is 1 to 3)

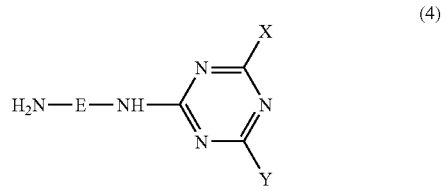

(4)

(wherein, E, X and Y have the same meanings as in the formula (1)), (4) The porphyrazine coloring matter or the salt thereof according to (3) characterized by being obtained in that the use amount of the organic amine represented by the formula (4) is 0.5 to 4 mol equivalent to 1 mol equivalent of the compound of the formula (3) and the reaction is carried out in the presence of ammonia with the pH in the reaction system being in the range of 7 to 10, (5) The porphyrazine coloring matter or the salt thereof according to claim 2, wherein the number of the pyridine ring or the pyrazine ring corresponding to A, B, C and D is 1 to 3; E represents C2 to C4 alkylene; each of X and Y is independently an unsubstituted anilino group, a sulfo-substituted anilino group, a carboxy-substituted anilino group, a phosphono-substituted anilino group, an unsubstituted naphthylamino group, a sulfo-substituted naphthylamino group or a carboxy-substituted naphthylamino group, said substituted anilino group and said substituted naphthylamino group may have further 0 to 3 substituents of one or more kinds selected from the group consisting of a sulfo group, a carboxy group, a phosphono group, a hydroxy group, an alkoxy group, a ureide group, an acetylamino group, a nitro group and a chlorine atom; and b is 0 to 2.9, c is 0.1 to 3, and the sum of b and c is 1 to 3, (6) The porphyrazine coloring matter or the salt thereof according to (5), wherein E represents ethylene or propylene, each of X and Y is independently a sulfo-substituted anilino group, a carboxy-substituted anilino group or a sulfo-substituted naphthylamino group; and b is 0 to 2.9, c is 0.1 to 3, and the sum of b and c is 1 to 3, (7) The porphyrazine coloring matter or the salt thereof according to (1), wherein A is a pyridine ring fused at the 2-position and the 3-position or at the 3-position and the 4-position or a pyrazine ring fused at the 2-position and the 3-position, B is a pyridine ring fused at the 2-position and the 3-position or at the 3-position and the 4-position or a pyrazine ring fused at the 2-position and the 3-position or a benzene ring, C is a pyridine ring fused at the 2-position and the 3-position or at the 3-position and 4-position or a pyrazine ring fused at the 2-position and the 3-position or a benzene ring, D is a benzene ring, and E is C2 to C4 alkylene; each of X and Y is independently an anilino group or a naphthylamino group having 1 to 3 substituents selected from the group consisting of a sulfo group, a carboxy group, a methoxy group, a nitro group, a chlorine atom and a hydroxy group; and b is 0 to 2.9 and c is 0.1 to 3, (8) The porphyrazine coloring matter or the salt thereof according to (1) or (2) represented by the following formula (2):

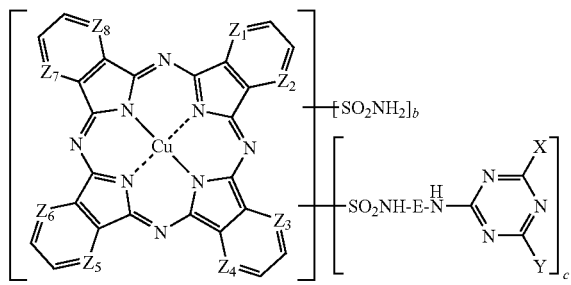

(wherein, each of $Z_1$ to $Z_8$ independently represents a nitrogen atom or a carbon atom, provided that at least one of the combinations of $Z_1$ and $Z_2$, $Z_3$ and $Z_4$, $Z_5$ and $Z_6$ and $Z_7$ and $Z_8$ is a combination of carbon atoms themselves and at least one of the rest represents a combination of a carbon atom and a nitrogen atom or a combination of nitrogen atoms themselves; and E, X, Y, b and c have the same meanings as described in the formula (1)), (9) The porphyrazine coloring matter or the salt thereof according to (8), which is obtained by reacting a porphyrazine compound represented by the following formula (5) with the organic amine represented by the formula (4) according to (3) in the presence of ammonia:

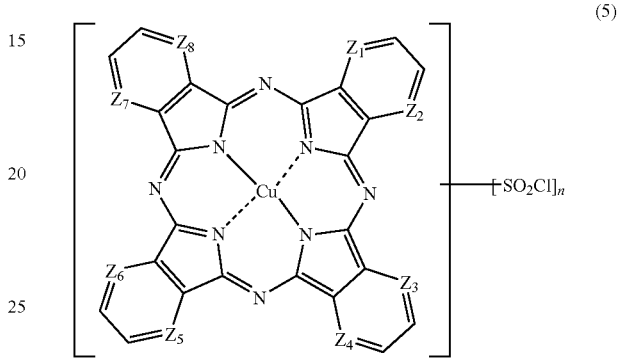

(wherein, $Z_1$ to $Z_8$ have the same meanings as in the formula (2), and n is 1 to 3)

(10) The porphyrazine coloring matter or the salt thereof according to (9) characterized by being obtained in that the use amount of the organic amine represented by the formula (4) is 0.5 to 4 mol equivalent to 1 mol equivalent of the compound of the formula (5) and the reaction is carried out in the presence of ammonia with the pH in the reaction system being in the range of 7 to 10,

(11) The porphyrazine coloring matter or the salt thereof according to (1) wherein A is a pyridine ring fused at the 2-position and the 3-position, B is a pyridine ring fused at the 2-position and the 3-position or a benzene ring, C is a pyridine ring fused at the 2-position and the 3-position or a benzene ring, D is a benzene ring, and E is C2 to C4 alkylene; each of X and Y is independently an anilino group or a naphthylamino group having 1 to 3 substituents selected from the group consisting of a sulfo group and a carboxy group; and b is 0 to 2.9 and c is 0.1 to 3,

(12) A mixture of coloring matters containing the porphyrazine coloring matter or the salt thereof according to any one of (1) to (11),

(13) A mixture of coloring matters of the porphyrazine coloring matter or the salt thereof according to any one of (1) to (11) and a phthalocyanine coloring matter,

(14) An ink characterized by containing the porphyrazine coloring matter or the salt thereof or the mixture of coloring matters thereof according to any one of (1) to (13) as a coloring matter component,

(15) The ink according to (14), which contains an organic solvent,

(16) The ink according to (14) or (15), which is for inkjet recording,

(17) An inkjet recording method characterized by using the ink according to any one of (14) to (16) as an ink or an ink set containing the ink in an inkjet recording method where ink drops are discharged responding to recording signals to record on a record-receiving material,

(18) The inkjet recording method according to (17), wherein the record-receiving material is a communication sheet.

(19) The inkjet recording method according to (18), wherein the communication sheet is a surface-treated sheet having an ink image receiving layer containing white inorganic pigment particles on the support,

(20) A container containing the ink according to any one of (14) to (16),

(21) An ink jet printer having the container according to (20),

(22) A colored product colored with the ink according to any one of (14) to (16),

(23) The porphyrazine coloring matter or the salt thereof according to (3), wherein the use amount of the organic amine represented by the formula (4) is 0.5 to 4 mol equivalent to 1 mol equivalent of the compound of the formula (3), the reaction is carried out in the range of pH 7 to 10 to obtain, and c of the formula (1) in (1) is 0.1 to 2.5,

(24) The porphyrazine coloring matter or the salt thereof according to the above (8), wherein c is 0.1 to 2.5,

(25) The porphyrazine coloring matter or the salt thereof according to (9), wherein the use amount of the organic amine represented by the formula (4) is 0.5 to 4 mol equivalent to 1 mol equivalent of the compound of the formula (5), the reaction is carried out in the range of pH 7 to 10 to obtain, and c of the formula (2) in (8) is 0.1 to 2.5,

(26) An ink containing an organic solvent as well as a mixture of coloring matters of the porphyrazine coloring matter or the salt thereof according to any one of (1) to (11) and a phthalocyanine coloring matter,

(27) The porphyrazine coloring matter or the salt thereof according to (1) to (11), wherein the porphyrazine coloring matter is the porphyrazine coloring matter according to (1) to (11) where one or two out of A, B, C and D are nitrogen-containing heterocycles or pyridine rings and the rest are benzene rings, or a mixture of the porphyrazine coloring matter according to (1) to (11) where one out of A, B, C and D is a nitrogen-containing heterocycle or a pyridine ring and the rest are benzene rings, and the porphyrazine coloring matter according to (1) to (11) where two out of A, B, C and D are nitrogen-containing heterocycles or pyridine rings and the rest two are benzene rings.

EFFECT OF THE INVENTION

An ink using the compound of the present invention is an ink which has a good hue as a cyan ink and is excellent in light fastness, ozone fastness and moisture fastness. In addition, it exhibits no crystal precipitation, no change in physical properties and color after storage for a long period of time, nor the like, so it has good storage stability. Further, it can show a color tone in a wide visible region by using together with other magenta ink and yellow ink, particularly a blue hue in a wider range when used together with magenta ink. Therefore, a cyan ink using the porphyrazine coloring matter of the present invention is extremely useful as an ink for inkjet recording.

BEST MODE FOR CARRYING OUT THE INVENTION

The present invention will be specifically explained. The ink suitable for inkjet recording of the present invention is characterized by containing the porphyrazine coloring matter of the above formula (1). That is, it has been found that an ink using tetrabenzoporphyrazine (typically referred to as phthalocyanine) where 1 to 3 of the 4 benzo rings are replaced with nitrogen-containing heteroaromatic rings as a mother nucleus of coloring matter and a porphyrazine coloring matter where an unsubstituted sulfamoyl group and a substituted sulfamoyl group are introduced has extremely excellent fastness to ozone gas, hardly causes bronze phenomenon and further exhibit a blue hue in a wider range when used together with magenta ink.

In this connection, when the term "alkyl" is used in the present description, the preferable number of carbon atoms varies depending on the use situation but is generally about 1 to 20, preferably about 1 to 10; and the term "aryl" used in the present description varies depending on the use situation but is typically an aromatic ring group having about 6 to 14 carbon atoms, preferably an aromatic ring group having about 6 to 10 carbon atoms, and can specifically include a phenyl group or a naphthyl group. In addition, the halogen atom can include a chlorine atom, a bromine atom, an iodine atom and the like, typically preferably a chlorine atom. Further, the heterocycle can include a heterocycle having 3 to 10 rings which contains a heteroatom such as an oxygen atom, a nitrogen atom or/and a sulfur atom.

In the above formula (1), the nitrogen-containing heteroaromatic ring in 6-membered aromatic rings of A to D includes, for example, a 6-membered aromatic ring containing 1 to 2 nitrogen atoms such as a pyridine ring, a pyrazine ring, a pyrimidine ring or a pyridazine ring. Among them, a pyridine ring is the most preferable. In the above formula (1), 1 to 3 out of A to D are nitrogen-containing heteroaromatic rings and the rest are benzene rings. As the number of nitrogen-containing heteroaromatic rings is increased, ozone fastness is improved but bronzing phenomenon is apt to occur, therefore it is advisable that the number of nitrogen-containing heteroaromatic rings is accordingly controlled to select a well balanced ratio in view of ozone fastness and bronzing phenomenon. Typically preferable is a compound where out of four 6-membered aromatic rings of A to D in the formula (1), 1 to 2.5, more preferably 1 to 2 as an average value are nitrogen-containing heteroaromatic rings and the rest are benzene rings.

In the present invention, a preferable aspect is a compound where the number of the nitrogen-containing heteroaromatic ring out of the four 6-membered aromatic rings of A to D in the formula (1) is 1, or a mixture of a compound where said number is 1 and a compound where said number is 2 or/and 3. Another more preferable aspect is a mixture of a compound where the number of the nitrogen-containing heteroaromatic ring in the four of A to D is 1 and a compound where said number is 2. With regard to the ratio of both coloring matters in a mixture of a compound where the number of the nitrogen-containing heteroaromatic ring is 1 and a compound where said number is 2 or/and 3, the mole ratio of the compound where the number of the nitrogen-containing heteroaromatic ring is 2 or/and 3 (more preferably is a compound where said number is 2) is 0 to 3 mol, more preferably 0 to 2 mol and further preferably 0 to 1 mol, to 1 mol of a compound where said number is 1.

In addition, the super-script "RTM" in the present description stands for registered trademark.

b is 0 to 2.9, c is 0.1 to 3, and the total sum of b and c is 1 to 3. As b becomes large, the ozone fastness tends to be improved but the bronzing phenomenon tends to be caused, so it is advisable that the numbers of b and c is accordingly controlled to select a well balanced ratio in view of ozone fastness and bronzing property. Preferably, c is 0.1 to 2.5, and the rest is b.

The alkylene in E includes, for example, alkylene having 2 to 12 carbon atoms and more preferably alkylene having 2 to 6 carbon atoms. The specific examples include ethylene, propylene, butylene, pentylene, hexylene, cyclopropylenediyl, 1,2- or 1,3-cyclopentylenediyl, 1,2-, 1,3- or 1,4-cyclohexylene and the like. Preferable is ethylene, propylene or butylene. More preferable is ethylene or propylene, and further preferable is ethylene.

Each of X and Y independently represents an unsubstituted or substituted anilino group or an unsubstituted or substituted naphthylamino group. The substituent of said substituted anilino group includes a sulfo group, a carboxy group, a phosphono group, a carbamoyl group, a sulfamoyl group, a ureide group, an alkyl group, an alkoxy group, an allyloxy group, a hydroxy group, a dialkylamino group, an alkylamino group, an arylamino group, an acetylamino group, a cyano group, a nitro group, a halogen atom and a heterocycle group, and said substituted anilino group may have 1 to 4 substituents of one or more kinds among them. Preferable substituent includes a sulfo group, a carboxy group and a hydroxy group. More preferable substituent includes a sulfo group or/and a carboxy group. Specifically included are, for example, a 2,5-disulfoanilino group, a 2-sulfoanilino group, a 3-sulfoanilino group, a 4-sulfoanilino group, a 2-carboxyanilino group, a 4-carboxyanilino group, a 4-ethoxy-2-sulfoanilino group, a 2-methyl-5-sulfoanilino group, a 2-methoxy-4-nitro-5-sulfoanilino group, a 2-chloro-5-sulfoanilino group, a 3-carboxy-4-hydroxyanilino group, a 3-carboxy-4-hydroxy-5-sulfoanilino group, a 2-hydroxy-5-nitro-3-sulfoanilino group, a 4-acetylamino-2-sulfoanilino group, a 4-anilino-3-sulfoanilino group, a 3,5-dichloro-4-sulfoanilino group, a 3-phosphonoanilino group, a 3,5-dicarboxyanilino group, a 2-carboxy-4-sulfoanilino group, a 2-carboxy-5-sulfoanilino group and the like. The substituent of said substituted naphthylamino group includes a sulfo group, a carboxy group, a ureide group, an alkyl group, an alkoxy group, a hydroxy group, a dialkylamino group, an alkylamino group, an arylamino group, an acetylamino group, a cyano group, a nitro group, a halogen atom and a heterocycle group, and said substituted naphthylamino group may have 1 to 4 substituents of one or more kinds among them. Preferable substituent includes a sulfo group and a hydroxy group. Specifically included are, for example, a 5,7-disulfonaphthalen-2-ylamino group, a 6,8-disulfonaphthalen-2-ylamino group, a 3,6-disulfonaphthalen-1-ylamino group, a 3,6,8-trisulfonaphthalen-1-ylamino group, a 8-hydroxy-3,6-disulfonaphthalen-1-ylamino group, a 4,8-disulfonaphthalen-2-ylamino group, a 3,6,8-trisulfonaphthalen-2-ylamino group, a 4,6,8-trisulfonaphthalen-2-ylamino group, a 8-chloro-3,6-disulfonaphthalen-1-ylamino group, a 8-hydroxy-6-sulfonaphthalen-2-ylamino group, a 5-hydroxy-7-sulfonaphthalen-2-ylamino group and the like.

The compound shown in free acid of the above formula (1) can also form a salt utilizing a sulfo group, a carboxy group, a phosphono group and the like in its molecule.

In the present invention, all the compounds represented by the above formula (1) when shown in free acid form are included in the present invention, and salts formed from the compound as described above are included in the present invention. The salt of the compound of the formula (1) is preferably a salt of an inorganic or organic cation. Examples of the salt include an alkali metal salt, an alkali earth metal salt and an ammonium salt. Preferable among them is an alkali metal salt, specifically a salts of lithium, sodium or potassium.

The alkali earth metal of the alkali earth metal salt includes, for example, calcium, magnesium and the like. The organic amine includes, for example, lower alkylamines having 1 to 3 carbon atoms such as methylamine and ethylamine, mono-, di- or tri- (C1-C4 lower alkanol) amines such as monoethanolamine, diethanolamine, triethanolamine, monoisopropanolamine, diisopropanolamine and triisopropanolamine. The preferable salt includes an alkali metal salt such as sodium salt, potassium salt and lithium salt, and an onium salt of mono-, di- or tri- (C1-C4 lower alkanol) amines such as monoethanolamine, diethanolamine, triethanolamine, monoisopropanolamine, diisopropanolamine and triisopropanolamine and an ammonium salt.

Specific examples of A, B, C, D, E, X and Y in the porphyrazine coloring matter represented by the above formula (1) of the present invention are shown in Table 1, but the porphyrazine coloring matter to be used in the present invention is not limited to the following examples. In addition, when the nitrogen-containing heteroaromatic ring corresponding to A, B, C or D is a pyridine ring, positional isomers of the nitrogen atom exist as described afterward and synthesis for coloring matter gives a mixture of isomers. It is difficult to isolate these isomers and it is also difficult to identify isomers by analysis. Therefore, the mixture is typically used as it is, and these isomers are not distinguished to describe here because no problem is particularly posed in the present invention in spite of a mixture of isomers.

TABLE 1

| No. | A | B | C | D | E | X | Y | b | c |
|---|---|---|---|---|---|---|---|---|---|
| 1 | 2,3-pyrido | Benzo | Benzo | Benzo | Ethylene | 3,6,8-trisulfonaphthalen-1-ylamino | 2-carboxyanilino | 2 | 1 |
| 2 | 2,3-pyrido | 2,3-pyrido | Benzo | Benzo | Ethylene | 3,6,8-trisulfonaphthalen-1-ylamino | 2-carboxyanilino | 1 | 1 |
| 3 | 2,3-pyrido | Benzo | 2,3-pyrido | Benzo | Ethylene | 3,6,8-trisulfonaphthalen-1-ylamino | 2-carboxyanilino | 1 | 1 |

TABLE 1-continued

| No. | A | B | C | D | E | X | Y | b | c |
|---|---|---|---|---|---|---|---|---|---|
| 4 | 2,3-pyrido | 2,3-pyrido | 2,3-pyrido | Benzo | Ethylene | 3,6,8-trisulfonaphthalen-1-ylamino | 2-carboxyanilino | 0 | 1 |
| 5 | 2,3-pyrido | Benzo | Benzo | Benzo | Ethylene | 3,6,8-trisulfonaphthalen-1-ylamino | 4-carboxyanilino | 2 | 1 |
| 6 | 2,3-pyrido | 2,3-pyrido | Benzo | Benzo | Ethylene | 3,6,8-trisulfonaphthalen-1-ylamino | 4-carboxyanilino | 1 | 1 |
| 7 | 2,3-pyrido | Benzo | 2,3-pyrido | Benzo | Ethylene | 3,6,8-trisulfonaphthalen-1-ylamino | 4-carboxyanilino | 1 | 1 |
| 8 | 2,3-pyrido | 2,3-pyrido | 2,3-pyrido | Benzo | Ethylene | 3,6,8-trisulfonaphthalen-1-ylamino | 4-carboxyanilino | 0 | 1 |
| 9 | 2,3-pyrido | Benzo | Benzo | Benzo | Ethylene | 3-sulfoanilino | 3-sulfoanilino | 2 | 1 |
| 10 | 2,3-pyrido | 2,3-pyrido | Benzo | Benzo | Ethylene | 3-sulfoanilino | 3-sulfoanilino | 1 | 1 |
| 11 | 2,3-pyrido | Benzo | 2,3-pyrido | Benzo | Ethylene | 3-sulfoanilino | 3-sulfoanilino | 1 | 1 |
| 12 | 2,3-pyrido | 2,3-pyrido | 2,3-pyrido | Benzo | Ethylene | 3-sulfoanilino | 3-sulfoanilino | 0 | 1 |
| 13 | 2,3-pyrido | Benzo | Benzo | Benzo | Ethylene | 6-sulfonaphthalen-2-ylamino | 4-sulfoanilino | 2 | 1 |
| 14 | 2,3-pyrido | 2,3-pyrido | Benzo | Benzo | Ethylene | 6-sulfonaphthalen-2-ylamino | 4-sulfoanilino | 1 | 1 |
| 15 | 2,3-pyrido | Benzo | 2,3-pyrido | Benzo | Ethylene | 6-sulfonaphthalen-2-ylamino | 4-sulfoanilino | 1 | 1 |
| 16 | 2,3-pyrido | 2,3-pyrido | 2,3-pyrido | Benzo | Ethylene | 6-sulfonaphthalen-2-ylamino | 4-sulfoanilino | 0 | 1 |
| 17 | 2,3-pyrido | Benzo | Benzo | Benzo | Ethylene | 3-sulfoanilino | 2-carboxy-4-sulfoanilino | 2 | 1 |
| 18 | 2,3-pyrido | 2,3-pyrido | Benzo | Benzo | Ethylene | 3-sulfoanilino | 2-carboxy-4-sulfoanilino | 1 | 1 |
| 19 | 2,3-pyrido | Benzo | 2,3-pyrido | Benzo | Ethylene | 3-sulfoanilino | 2-carboxy-4-sulfoanilino | 1 | 1 |
| 20 | 2,3-pyrido | 2,3-pyrido | 2,3-pyrido | Benzo | Ethylene | 3-sulfoanilino | 2-carboxy-4-sulfoanilino | 0 | 1 |
| 21 | 2,3-pyrido | Benzo | Benzo | Benzo | Ethylene | 4-sulfoanilino | 3-sulfoanilino | 2 | 1 |
| 22 | 2,3-pyrido | 2,3-pyrido | Benzo | Benzo | Ethylene | 4-sulfoanilino | 3-sulfoanilino | 1 | 1 |
| 23 | 2,3-pyrido | Benzo | 2,3-pyrido | Benzo | Ethylene | 4-sulfoanilino | 3-sulfoanilino | 1 | 1 |
| 24 | 2,3-pyrido | 2,3-pyrido | 2,3-pyrido | Benzo | Ethylene | 4-sulfoanilino | 3-sulfoanilino | 0 | 1 |
| 25 | 2,3-pyrido | Benzo | Benzo | Benzo | Ethylene | 2,5-disulfoanilino | 2-carboxy-4-sulfoanilino | 2 | 1 |
| 26 | 2,3-pyrido | 2,3-pyrido | Benzo | Benzo | Ethylene | 2,5-disulfoanilino | 2-carboxy-4-sulfoanilino | 1 | 1 |
| 27 | 2,3-pyrido | Benzo | 2,3-pyrido | Benzo | Ethylene | 2,5-disulfoanilino | 2-carboxy-4-sulfoanilino | 1 | 1 |
| 28 | 2,3-pyrido | 2,3-pyrido | 2,3-pyrido | Benzo | Ethylene | 2,5-disulfoanilino | 2-carboxy-4-sulfoanilino | 0 | 1 |
| 29 | 2,3-pyrido | Benzo | Benzo | Benzo | Ethylene | 5,7-disulfonaphthalen-2-ylamino | 5,7-disulfonaphthalen-2-ylamino | 2 | 1 |
| 30 | 2,3-pyrido | 2,3-pyrido | Benzo | Benzo | Ethylene | 5,7-disulfonaphthalen-2-ylamino | 5,7-disulfonaphthalen-2-ylamino | 1 | 1 |
| 31 | 2,3-pyrido | Benzo | 2,3-pyrido | Benzo | Ethylene | 5,7-disulfonaphthalen-2-ylamino | 5,7-disulfonaphthalen-2-ylamino | 1 | 1 |
| 32 | 2,3-pyrido | 2,3-pyrido | 2,3-pyrido | Benzo | Ethylene | 5,7-disulfonaphthalen-2-ylamino | 5,7-disulfonaphthalen-2-ylamino | 0 | 1 |
| 33 | 2,3-pyrido | Benzo | Benzo | Benzo | Propylene | 3,6,8-trisulfonaphthalen-1-ylamino | 2-carboxyanilino | 2 | 1 |
| 34 | 2,3-pyrido | Benzo | Benzo | Benzo | Butylene | 3,6,8-trisulfonaphthalen-1-ylamino | 2-carboxyanilino | 2 | 1 |
| 35 | 2,3-pyrazino | Benzo | Benzo | Benzo | Ethylene | 3,6,8-trisulfonaphthalen-1-ylamino | 2-carboxyanilino | 2 | 1 |

TABLE 1-continued

| No. | A | B | C | D | E | X | Y | b | c |
|---|---|---|---|---|---|---|---|---|---|
| 36 | 3,4-pyrido | Benzo | Benzo | Benzo | Ethylene | 3,6,8-trisulfonaphthalen-1-ylamino | 2-carboxyanilino | 2 | 1 |
| 37 | 2,3-pyrido | Benzo | Benzo | Benzo | Ethylene | 8-hydroxy-3,6-disulfonaphthalen-1-ylamino | 3-carboxy-4-hydroxy-5-sulfoanilino | 2 | 1 |
| 38 | 2,3-pyrido | Benzo | Benzo | Benzo | Ethylene | 2,4-disulfoanilino | 2-methoxy-5-sulfoanilino | 2 | 1 |
| 39 | 2,3-pyrido | Benzo | Benzo | Benzo | Ethylene | 2,5-disulfoanilino | 2,5-dichloro-4-sulfoanilino | 2 | 1 |
| 40 | 2,3-pyrido | Benzo | Benzo | Benzo | Ethylene | 3,6,8-trisulfonaphthalen-1-ylamino | 2-carboxy-4-sulfoanilino | 2 | 1 |
| 41 | 2,3-pyrido | 2,3-pyrido | Benzo | Benzo | Ethylene | 3,6,8-trisulfonaphthalen-1-ylamino | 2-carboxy-4-sulfoanilino | 1 | 1 |
| 42 | 2,3-pyrido | Benzo | 2,3-pyrido | Benzo | Ethylene | 3,6,8-trisulfonaphthalen-1-ylamino | 2-carboxy-4-sulfoanilino | 1 | 1 |
| 43 | 2,3-pyrido | 2,3-pyrido | 2,3-pyrido | Benzo | Ethylene | 3,6,8-trisulfonaphthalen-1-ylamino | 2-carboxy-4-sulfoanilino | 0 | 1 |
| 44 | 2,3-pyrido | Benzo | Benzo | Benzo | Ethylene | 3,6,8-trisulfonaphthalen-1-ylamino | 2-carboxy-5-sulfoanilino | 2 | 1 |
| 45 | 2,3-pyrido | Benzo | Benzo | Benzo | Ethylene | 3,6,8-trisulfonaphthalen-1-ylamino | 2-nitro-4-sulfoanilino | 2 | 1 |
| 46 | 2,3-pyrido | Benzo | Benzo | Benzo | Ethylene | 5,7-disulfonaphthalen-2-ylamino | 2-carboxy-4-sulfoanilino | 2 | 1 |
| 47 | 2,3-pyrido | Benzo | Benzo | Benzo | Ethylene | 6,8-disulfonaphthalen-2-ylamino | 6,8-disulfonaphthalen-2-ylamino | 2 | 1 |
| 48 | 2,3-pyrido | Benzo | Benzo | Benzo | Ethylene | 6,8-disulfonaphthalen-2-ylamino | 2-carboxy-4-sulfoanilino | 2 | 1 |

The method to produce the compound of the formula (1) of the present invention will be explained.

Firstly, a copper porphyrazine coloring matter represented by the following formula (6) is synthesized.

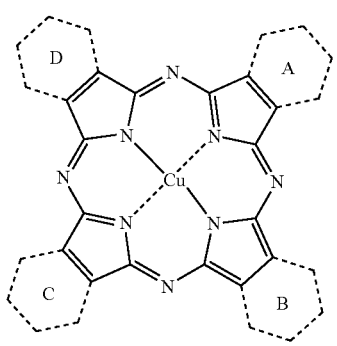

(6)

(wherein, A, B, C and D have the same meanings as in the formula (1))

In order to synthesize the copper porphyrazine coloring matter represented by the above formula (6), a conventional known manner can be applied. For example, it is obtained by reaction of a 6-membered nitrogen-containing heteroaromatic ring dicarboxylic acid derivative having aromaticity with a phthalic acid derivative in the presence of catalyst and a copper compound.

The number of nitrogen-containing heteroaromatic rings and the number of benzene rings in A, B, C and D can be adjusted by changing the molar ratio in reaction of the nitrogen-containing heteroaromatic ring dicarboxylic acid derivative with the phthalic acid derivative. For example, when 1 to 3 out of 4 aromatic 6-membered rings of A to D in the present invention are nitrogen-containing heteroaromatic rings and the rest are benzene rings, an intended compound can be obtained by that the nitrogen-containing heteroaromatic ring dicarboxylic acid derivative and the phthalic acid derivative are respectively used at a use ratio in the range of 0.25 mol to 0.75 mol according to the content ratio so that the total of the both is 1 mol. For example, in the case of 1 nitrogen-containing heteroaromatic ring and 3 benzene rings, it is advisable the nitrogen-containing heteroaromatic ring dicarboxylic acid derivative is used at a ratio of 0.25 mol and the phthalic acid derivative is used at a ratio of 0.75 mol.

The nitrogen-containing heteroaromatic ring dicarboxylic acid derivative includes a 6-membered nitrogen-containing heteroaromatic ring dicarboxylic acid derivative having carboxy groups or reactive groups derived therefrom (such as an acid amide group, an imide group, an acid anhydride group, a carbonitrile group) respectively at 2 adjacent positions. Specifically, it includes dicarboxylic acid compounds such as quinolinic acid, 3,4-pyridine dicarboxylic acid and 2,3-pyrazinedicarboxylic acid, acid anhydride compounds such as quinolinic anhydride, 3,4-pyridinedicarboxylic anhydride and 2,3-pyrazinedicarboxylic anhydride, dicarboxamide compounds such as pyridine-2,3-dicarboxamide, dicarboxylic acid monoamide compounds such as pyrazine-2,3-dicarboxylic acid monoamide, acid imide compounds such as quinolinic acid imide, and dicarbonitrile compounds such as pyridine-2,3-dicarbonitrile and pyrazine-2,3-dicarbonitrile. In addition, the phthalic acid derivative includes phthalic acid, phthalic anhydride, phthalamide, phthalamic acid, phthalimide, phthalonitrile, 1,3-diiminoisoindoline, 2-cyanobenzamide and the like.

The method to synthesize copper porphyrazine coloring matter typically includes the nitrile method and Wyler method, which require different reaction conditions and the like. The nitrile method is a method for synthesis of a porphyrazine coloring matter using, as a material, a dicarbonitrile compound such as pyridine-2,3-dicarbonitrile, pyrazine-2,3-dicarbonitrile and phthalonitrile. On the other hand, Wyler method utilizes, as a material, a dicarboxylic acid compound such as phthalic acid, quinolinic acid, 3,4-pyridine dicarboxylic acid and 2,3-pyrazinedicarboxylic acid, an acid anhydride compound such as phthalic anhydride, quinolinic anhydride, 3,4-pyridinedicarboxylic anhydride and 2,3-pyrazinedicarboxylic anhydride, a dicarboxamide compound such as phthalamide, pyridine-2,3-dicarboxamide, a dicarboxylic acid monoamide compound such as phthalamic acid and pyrazine-2,3-dicarboxylic acid monoamide, and acid imide compounds such as phthalimide and quinolinic acid imide. In Wyler method, addition of urea is essential and the use amount of urea is a molar quantity of 5 to 100 times mol to 1 mol of the total amount of the nitrogen-containing heteroaromatic ring dicarboxylic acid derivative and the phthalic acid derivative.

Typically, the reaction is carried out in the presence of a solvent and the nitrile method utilizes, as a solvent, an organic solvent having a boiling point of 100° C. or more, more preferably 130° C. or more. The solvent includes, for example, n-amylalcohol, n-hexanol, cyclohexanol, 2-methyl-1-pentanol, 1-heptanol, 1-octanol, 2-ethylhexanol, N,N-dimethylaminoethanol, benzyl alcohol, ethyleneglycol, propylene glycol, trichlorobenzene, chloronaphthalene, nitrobenzene, quinoline, sulfolane, urea or the like. On the other hand, Wyler method utilizes, as a solvent, an aprotic organic solvent having a boiling point of 150° C. or more, more preferably 180° C. or more. The solvent includes, for example, trichlorobenzene, chloronaphthalene, nitrobenzene, quinoline, sulfolane, urea or the like. The use amount of solvent is 1 to 100 times mass of the total amount of the nitrogen-containing heteroaromatic ring dicarboxylic acid derivative and the phthalic acid derivative.

The catalyst in the nitrile method includes cyclic bases such as quinoline and 1,8-diazabicyclo[5,4,0]-7-undecene; amines such as tributylamine, ammonia and N,N-dimethylaminoethanol; and alkali metal alcoholates such as sodium ethoxide and sodium methoxide. On the other hand, the catalyst in Wyler method includes ammonium molybdate, boric acid and the like. The addition amount is 0.001 to 1 time mol to 1 mol of the total amount of the nitrogen-containing heteroaromatic ring dicarboxylic acid derivative and the phthalic acid derivative.

The copper compound includes metal copper or copper compounds such as halide, carboxylic acid salt, sulfuric acid salt, nitric acid salt, acetylacetonate or complexes of copper. The copper compound includes copper chloride, copper bromide, copper acetate, copper acetylacetonate and the like. The use amount of the copper compound is 0.15 to 0.35 times mol to 1 mol of the total amount of the nitrogen-containing heteroaromatic ring dicarboxylic acid derivative and the phthalic acid derivative.

The reaction temperature in the nitrile method is typically 100 to 200° C. and preferably 130 to 170° C. On the other hand, the reaction temperature in Wyler method is 150 to 300° C. and preferably 170 to 220° C. In addition, the reaction time varies depending on the reaction conditions, however is typically 1 to 40 hours. After completion of reaction, the copper porphyrazine coloring matter of the above formula (6) is obtained by filtration, washing and drying.

The present invention will be more specifically explained taking, for an example, the compound (copper dibenzobis(2,3-pyrido)porphyrazine) represented by the above formula (6) where two out of A to D are pyridine rings and the rest two are benzene rings.

The copper dibenzobis(2,3-pyrido)porphyrazine represented by the above formula (6) where two out of A, B, C and D are pyridine rings and the rest two are benzene rings is obtained by reaction of quinolinic acid (0.5 mol), phthalic anhydride (0.5 mol), copper (II) chloride (0.25 mol), ammonium phosphomolybdate (0.004 mol) and urea (6 mol) in a sulfolane solvent at 200° C. for 5 hours. The reactivity varies depending on the kind or the use amount of quinolinic acid, phthalic anhydride, metal compound, solvent, catalyst and the like, not limited to the above.

In addition, when synthesis is carried out by the above methods, the main component is copper dibenzobis(2,3-pyrido)porphyrazine, and five kinds of isomers {the formulas (7-A) to (7-E)} where the positions of the pyridine ring and the pyridine ring nitrogen atom are different are produced. At the same time, copper tribenzo(2,3-pyrido)porphyrazine {the formula (8) described later} represented by the above formula (6) where one out of A to D is a pyridine ring and the rest three are benzene rings and copper benzotris(2,3-pyrido)porphyrazine represented by the above formula (6) where three out of A to D are pyridine rings and the rest one is a benzene ring are by-produced and positional isomers of the pyridine ring nitrogen atom {the formulas (9-A) to (9-D) described later} further exist in these compounds, resulting in a complex mixture. Furthermore, copper tetrakis(2,3-pyrido)porphyrazine and copper phthalocyanine (copper tetrabenzoporphyrazine) are also produced even in an small amount. In general, it is difficult to isolate only the intended product from these mixtures, which are used intact in most cases as copper dibenzobis(2,3-pyrido)porphyrazine where the two are pyridine rings and the rest two are benzene rings on average.

In the above description, copper dibenzobis(2,3-pyrido)porphyrazine where two out of A to D are pyridine rings and the rest two are benzene rings is mentioned. Even in the case of a nitrogen-containing heteroaromatic ring except for pyridine, the compound where two are said nitrogen-containing heteroaromatic rings and the rest two are benzene rings can be obtained as well by carrying out synthesis according to the above, corresponding to said nitrogen-containing heteroaromatic ring. Moreover, it can be obtained as well, in the case of a compound having 1 or 3 nitrogen-containing heteroaromatic rings; a mixture of a compound having 1 nitrogen-containing heteroaromatic ring and a compound having 2 and/or 3 nitrogen-containing heteroaromatic rings; or the like, by changing the use ratio of the nitrogen-containing heteroaromatic ring dicarboxylic acid derivative and the phthalic acid derivative respectively depending on the ratio of the nitrogen-containing heteroaromatic ring and the benzene ring of the intended compound so that the ratio is in the range of about 0.25 mol to 0.75 mol and the total of the both is 1 mol.

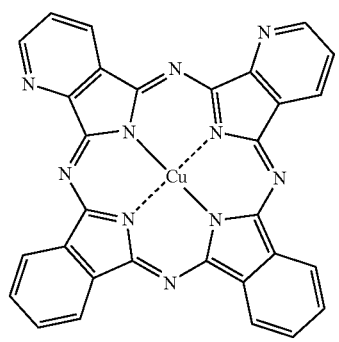
(7-A)
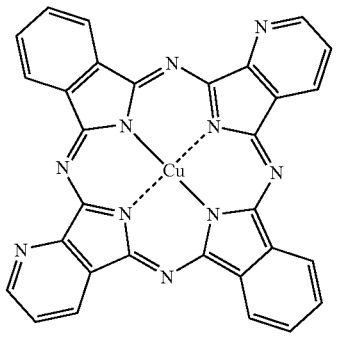
(7-E)
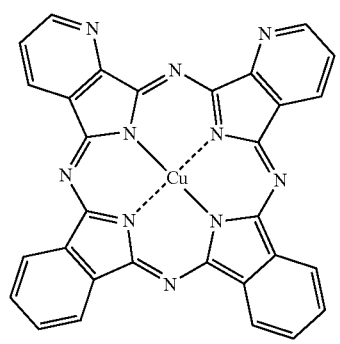
(7-B)
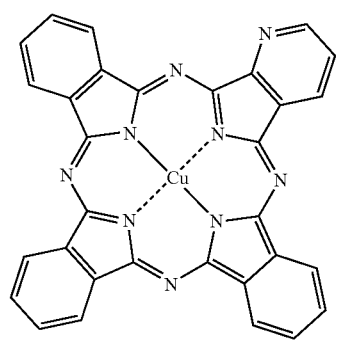
(8)
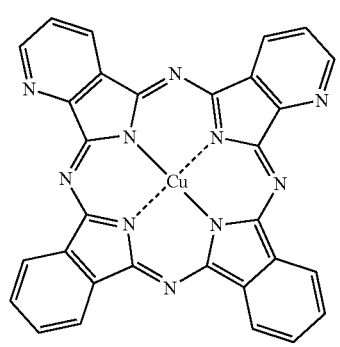
(7-C)
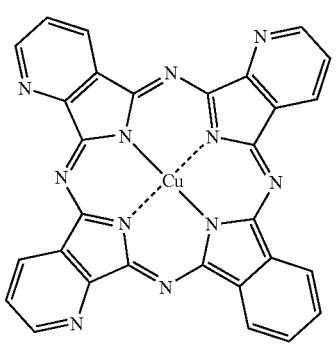
(9-A)
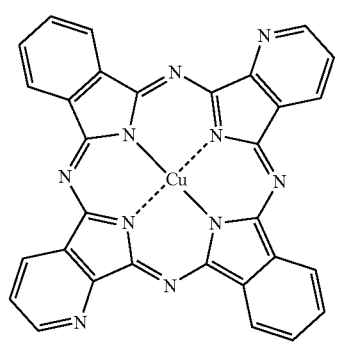
(7-D)
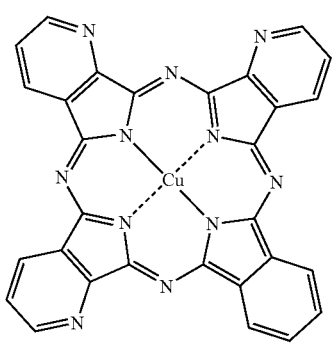
(9-B)

-continued

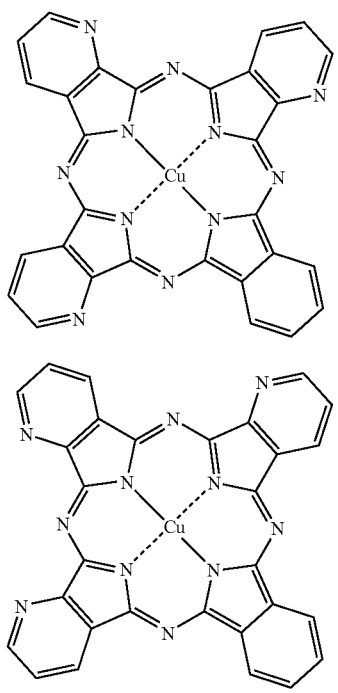

(9-C)

(9-D)

Next, the copper chlorosulfonylporphyrazine compound represented by the formula (3) is obtained by chlorosulfonylation of the copper porphyrazine coloring matter represented by the formula (6) in chlorosulfonic acid, or by sulfonation of the copper porphyrazine coloring matter represented by the formula (6) in sulfuric acid or fuming sulfuric acid followed by conversion of the sulfo group into a chlorosulfonyl group with a chlorination agent. The thus obtained chlorosulfonyl group or sulfo group is not introduced on the heteroaromatic ring group but introduced on the benzene ring, in A to D of the formula (6). Typically one chlorosulfonyl group or sulfo group is introduced on a benzene ring, so the number of the group introduced is within the number of the benzene ring. Therefore, the number of chlorosulfonyl groups (n) in the formula (3) is 1 to 3 corresponding to the number of the benzene ring of the compound of the formula (3). The intended compound of the formula (3) can be obtained by synthesis, as another example, of copper chlorosulfonylporphyrazine compound represented by the formula (3), where the copper porphyrazine coloring matter having a sulfo group represented by the formula (11) described later is synthesized by cyclocondensation with sulfophthalic acid having a sulfo group and quinolinic acid, followed by conversion of the sulfo group into a chlorosulfonyl group. The number of $SO_2Cl$ groups (n) in the obtained compound of the formula (3) is 1 to 3 on average and preferably 2 to 3 on average, as above.

The conditions of chlorosulfonylation reaction of the copper porphyrazine coloring matter are that chlorosulfonic acid is typically used as a solvent and the use amount is 3 to 20 times by weight of the porphyrazine coloring matter and preferably 5 to 10 times by weight. The reaction temperature is typically 100 to 150° C. and preferably 120 to 150° C. The reaction time varies depending to the reaction conditions such as reaction temperature, however typically 1 to 10 hours. In this case, the substituent of the copper porphyrazine compound obtained is a mixture of a chlorosulfonyl group and a sulfo group, so it is preferable in the present invention that a chlorination agent such as thionyl chloride other than chlorosulfonic acid is further added to the reaction solution with chlorosulfonic acid to carry out the reaction so that the sulfo groups are all chlorosulfonylated. The amount of the chlorination agent other than the chlorosulfonic acid to be added is about 0.5 to 10 equivalents and preferably 0.5 to 5 equivalents to the sulfo group in the sulfo-substituted copper porphyrazine coloring matter. The chlorination agent includes chlorosulfonic acid, thionyl chloride, sulfuryl chloride, phosphorus trichloride, phosphorus pentachloride, phosphorus oxychloride and the like, but not limited thereto.

In addition, the copper chlorosulfonylporphyrazine compound is also obtained by that a chlorination agent is applied to the copper porphyrazine coloring matter having a sulfo group represented by the following formula (11) for conversion of the sulfo group into a chlorosulfonyl group. The solvent to be used for chlorination reaction includes sulfuric acid, fuming sulfuric acid, chlorosulfonic acid, benzene, toluene, nitrobenzene, chlorobenzene, N,N-dimethylformamide, N,N-dimethylacetoamide and the like, but not limited thereto. Further, the chlorination agent includes chlorosulfonic acid, thionyl chloride, sulfuryl chloride, phosphorus trichloride, phosphorus pentachloride, phosphorus oxychloride and the like, but not limited thereto.

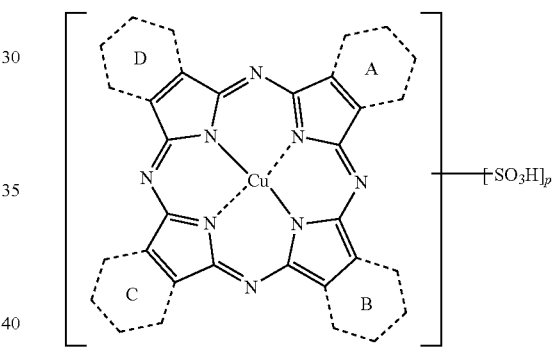

(11)

(wherein, A, B, C and D have the same meanings as above and p is 1 to 3)

Next, the intended compound of the above formula (1) can be obtained by reaction of the copper chlorosulfonylporphyrazine compound (hereinafter, optionally, also referred to as chlorosulfonyl-POR) obtained above with the organic amine represented by the following formula (4) in the presence of ammonia (or in the presence of an aminating agent) in a water solvent, typically at pH 7 to 10, preferably pH 8 to 10, and typically 0 to 100° C., preferably 5 to 70° C., typically for 1 to 20 hours. Ammonia or ammonia source to be used for the reaction (the both are also together referred to as an aminating agent) includes, for example, ammonium salts such as ammonium chloride and ammonium sulfate, urea, ammonia water, ammonia gas and the like, but not limited thereto. In addition, the reaction of the copper chlorosulfonylporphyrazine compound, organic amine and an aminating agent is typically carried out in a water solvent.

In this connection, for adjustment of the pH in the condensation, for example, commercially available 28% ammonia water is used directly or, if needed, after diluting with water. In addition, for example, when a compound of the formula (1) where b is 2 and c is 1 is also desired to be synthesized, a compound of the above formula (11) where p is 3 can be introduced into a chlorosulfonyl derivative and then reacted at the pH of the reaction system adjusted with an alkali metal hydroxide such as sodium hydroxide and potassium hydroxide or an alkali metal carbonate such as sodium carbonate and potassium carbonate in the presence of at least 2 mol equivalent of ammonia to said chlorosulfonyl-POR, in order to obtain a compound of the above formula (1) where b is 2 and c is 1.

The pH in the reaction system is advisably in the range of typically 7 to 10, preferably 7.5 to 10 and more preferably 8 to 9.5 to carry out the reaction. In the case of obtaining the above formula (1), there is a tendency that a pH smaller than 7 in the reaction system results in that the chlorosulfonyl-POR is hydrolyzed to increase the ratio of a sulfonic acid derivative as a by-product, and a pH larger than 10 in the reaction system results in that hydrolyzation of the chlorosulfonyl-POR occurs as well as ammonia, if existing in large excess in the reaction system, is preferentially reacted with the chlorosulfonyl-POR to extremely decrease the reaction rate of the organic amine of the following formula (4) with the chlorosulfonyl-POR.

Therefore, it is advisable that the addition ratio of ammonia, the organic amine of the following formula (4) and said chlorosulfonyl-POR and the pH in the reaction system are appropriately set in view of these points.

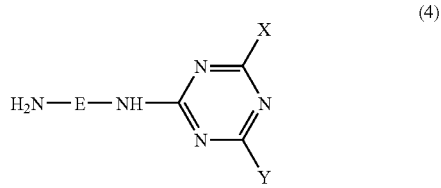

(4)

(wherein, E, X and Y have the same meanings as in the formula (1))

in this connection, the use amount of the organic amine represented by the above formula (4) is typically 0.5 mol equivalent to 4 mol equivalent, preferably 0.5 mol equivalent to 3.5 mol equivalent and more preferably 1 mol equivalent to 3 mol equivalent of the theoretical value to 1 mol of the copper chlorosulfonylporphyrazine compound. However, it varies depending on the reactivity of organic amine and the reaction conditions and not limited to these.

The method to produce the organic amine represented by the formula (4) will be explained.

For example, typically 0.95 to 1.1 mol of an aniline or a naphthylamine corresponding to X is reacted with 1 mol of 2,4,6-trichloro-5-triazine (cyanuric chloride) in water at typically pH 3 to 7 and typically 5 to 40° C. for typically 2 to 12 hours to obtain a first condensate. Next, typically 0.95 to 1.1 mol of an aniline or a naphthylamine corresponding to Y is reacted at typically pH 4 to 10 and typically 5 to 80° C. for typically 0.5 to 12 hours to obtain a second condensate. Next, 1 to 50 mol of an alkylene diamine corresponding to E is reacted at typically pH 9 to 12 and typically 5 to 90° C. for typically 0.5 to 8 hours to obtain the organic amine of the above formula (4). For pH adjustment in the condensation, typically an alkali metal hydroxide such as sodium hydroxide and potassium hydroxide, an alkali metal carbonate such as sodium carbonate and potassium carbonate, and the like can be used. In this connection, the sequence order of the condensation is appropriately determined according to the reactivity of each compound and not limited to the above.

In addition, the copper porphyrazine coloring matters represented by the above formulas (1) and (2) are synthesized by reacting a copper chlorosulfonylporphyrazine compound represented by the above formula (3) with the organic amine represented by the above formula (4) in the presence of ammonia (or in the presence of an aminating agent), and therefore it can be considered theoretically that some chlorosulfonyl-POR of the formula (3) is hydrolyzed by water mixed in the reaction system and produced a compound converted into sulfonic acid as a by-product, which is thus mixed in the intended coloring matters of the formulas (1) and (2). It is, however, difficult to distinguish unsubstituted sulfamoyl groups from sulfonic acid groups in mass spectrometric analysis, so in the present invention, chlorosulfonyl groups in formula (3) except for chlorosulfonyl groups reacted with organic amine represented by the formula (4) are all described as converted into unsubstituted sulfamoyl groups.

In addition, in some of the copper porphyrazine coloring matter represented by the above formulas (1) and (2), impurities are by-produced in which copper porphyrazine ring (Pz) forms a dimer (for example, Pz-L-Pz) or a trimer via a divalent linking group (L), which may be mixed into the reaction product.

The divalent linking group represented by the above L includes —SO$_2$—, —SO$_2$—NH—SO$_2$— and the like, and a by-product where these two Ls are combined may be formed in the case of a trimer.

In addition, optionally by-produced are copper tetrakis(2,3-pyrido)porphyrazine and copper phthalocyanine(copper tetra benzoporphyrazine) having an unsubstituted sulfonamide group and a substituted sulfonamide group in the formula (1) of the present invention which are from copper tetrakis(2,3-pyrido)porphyrazine and copper phthalocyanine (copper tetra benzoporphyrazine) which are described above to be produced in a small amount in the above synthesis of copper porphyrazine.

These by-products including copper tetrakis(2,3-pyrido)porphyrazine which is by-produced in a small amount in synthesis of copper porphyrazine are about within 35% at most, typically within 30% and preferably within 15% to the whole synthetic coloring matter. These by-products are all coloring matters and also referred to as by-produced coloring matter in the present description. Among these by-produced coloring matters, for example, copper phthalocyanine (copper tetra benzoporphyrazine) having an unsubstituted sulfonamide group and a substituted sulfonamide group in the formula (1) of the present invention is within the range of 0 to 35% at most, typically within 0 to 30%. In addition, another by-produced coloring matter may be contained in an amount of about 0 to 15%, while the rest is copper porphyrazine coloring matter represented by the formula (1) in the present invention.

Therefore, the coloring matter of the present invention is obtained typically as a mixture of coloring matters containing 65% to 100%, more preferably 85% to 100% and optionally 85 to 99% of the copper porphyrazine coloring matter of the formula (1) and 0 to 35%, more preferably 0 to 15% and optionally 1 to 15% of by-produced coloring matters.

The copper porphyrazine coloring matter of the present invention thus obtained can be separated by filtration and the like after aciding out or salting out. Salting out is preferably carried out, for example, under acidic to alkali conditions, preferably in the range of pH 1 to 11. The temperature in salting out is not particularly limited, but it is preferred to heat typically to 40 to 80° C., preferably 50 to 70° C., and then add a sodium chloride and the like for salting out.

The copper porphyrazine coloring matters represented by the above formula (1) and the formula (2) synthesized by the above method is obtained in free acid form or a salt form thereof. Its free acid form can be obtained, for example, by aciding out. On the other hand, its salt form can be obtained by salting out; or if the desired salt cannot be obtained by salting out, for example, by utilizing a typical salt exchange method of adding a desired organic or inorganic base to its free acid form.

A preferable porphyrazine coloring matter represented by the formula (1) or (2) of the present invention is one where 1 to 3, preferably 1 to 2 out of A to D are pyridine rings or pyrazine rings (more preferably pyridine rings); the sum of b and c is 2 to 3, c is 0.1 to 2.5 and the rest is b (more preferably, the sum of b and c is 3, c is 1 to 2.5 and b is 0.5 to 2); X is a sulfoanilino group or a sulfonaphthyl group (more preferably a sulfoanilino group), and these may be further substituted by 1 to 2 groups selected from the group consisting of a sulfo group and a carboxy group; and Y is an anilino group substituted by 1 to 2 groups selected from the group consisting of a sulfo group and a carboxy group (more preferably a sulfoanilino group). A combination of a more preferable one among these and another, particularly a combination of 2 or 3 kinds of more preferable ones, is more preferable.

The porphyrazine coloring matter represented by the formula (1) of the present invention can be mixed with a conventional phthalocyanine coloring matter for use. In that case, the porphyrazine coloring matter of the present invention is 50 to 100%, preferably 70 to 100% and more preferably 90 to 100% and a conventional phthalocyanine coloring matter is 0 to 50%, preferably 0 to 30% and more preferably about 0 to 10%. As the conventional phthalocyanine coloring matter, any of the phthalocyanine coloring matters described in Background Art can be used.

Next, the ink of the present invention will be explained.

The porphyrazine coloring matter of the above formula (1) or the salt thereof which is produced by the above method exhibits vivid cyan. Therefore, an ink containing these can be also used mainly as a cyan ink. Said ink can be used not only as a cyan ink having a high concentration but also as a cyan ink having a low concentration of the coloring matter (which is called light cyan ink, photo cyan ink or the like) which is used to smoothly reproduce the gradation part of image or to decrease granular quality of the hypochromic region.

The ink of the present invention is prepared using water as a medium. When this ink is an ink for inkjet recording, said porphyrazine coloring matter (hereinafter, which means, when called the porphyrazine coloring matter for simplicity, any of a free porphyrazine coloring matter, a salt thereof and a mixture of a free porphyrazine coloring matter and a salt thereof unless otherwise specifically noted) which is used in it preferably contains a small amount of anion such as $Cl^-$ and $SO_4^{2-}$. The content is, as the total amount of $Cl^-$ and $SO_4^{2-}$, 5% mass or less, preferably 3% mass or less, further preferably 1% mass or less in the porphyrazine coloring matter, and 1% mass or less in the ink, only as a guide. The porphyrazine coloring matter of the present invention having a small content of $Cl^-$ and $SO_4^{2-}$ can be produced by desalting treatment, for example, by a typical method using a reverse osmosis membrane or by a method where a dried form or a wet cake of the porphyrazine coloring matter of the present invention or the salt thereof is stirred in a mixed solvent of alcohol and water. In the latter case, alcohol to be used is a lower alcohol having a 1 to 4 carbon atoms, preferably an alcohol having 1 to 3 carbon atoms, and further preferably methanol, ethanol or 2-propanol. On the other hand, in desalting treatment of the latter, a method of heating to near the boiling point of the alcohol to be used and then cooling for desalination can be also employed. The porphyrazine coloring matter of the present invention having a small content of $Cl^-$ and $SO_4^{2-}$ in a dry state can be obtained by that the porphyrazine coloring matter of the present invention subjected to desalting treatment in a mixed solvent of alcohol and water is separated by filtration in an conventional manner and then dried. The content of $Cl^-$ and $SO_4^{2-}$ is determined by, for example, an ion chromatography.

In the case that the ink of the present invention is an ink for inkjet recording, the porphyrazine coloring matter to be used in it preferably contains a small amount of heavy metal (ion) such as zinc and/or iron; metal (ion) such as calcium; silica; and the like besides the above $Cl^-$ and $SO_4^{2-}$ (except for copper which is contained as a central metal atom in a porphyrazine skeleton by ionic bond or coordination bond). Each preferable content of heavy metal (ion), metal (ion) such as calcium, silica and the like which are exemplified above is, for example, about 500 ppm or less in a purified, dried form of the porphyrazine coloring matter, only as a guide. The contents of the above heavy metal (ion) and metal (ion) are determined by an ion chromatography, an atomic absorption method, or an ICP (Inductively Coupled Plasma) emission spectrometry.

The ink of the present invention contains typically 0.1 to 8% by mass and preferably 0.3 to 6% by mass of the porphyrazine coloring matter of the formula (1). The ink of the present invention may further contain, if needed, a water-soluble organic solvent within the range not to impair the effects of the present invention. Typically, it more preferably contains a water-soluble organic solvent. The water-soluble organic solvent is used as a dye dissolving agent, a drying preventive (wetting agent), a viscosity modifier, a penetration enhancer, a surface tension modifier, an antifoaming agent and/or the like. In addition, for example, an antiseptic and fungicide, a pH adjuster, a chelating agent, a rust-preventive agent, an ultraviolet absorber, a viscosity modifier, a dye dissolving agent, an anti-fading agent, an emulsion stabilizer, a surface tension modifier, an antifoaming agent, a dispersing agent, a dispersion stabilizer and the like may be added in the ink of the present invention as the other ink preparation agents. The content of the water-soluble organic solvent (relative to the whole ink) is 0 to 60% by mass and preferably 10 to 50% by mass. The content of ink preparation agents (relative to the whole ink) is 0 to 20% by mass and preferably 0 to 15% by mass. The rest is water.

Said water-soluble organic solvent includes, for example, C1 to C4 alkanol such as methanol, ethanol, n-propanol, isopropanol, n-butanol, isobutanol, secondary butanol or tertiary butanol; carboxylic acid amide such as N,N-dimethylformamide or N,N-dimethylacetoamide; heterocyclic ketone such as 2-pyrolidone, N-methyl-2-pyrolidone, 1,3-dimethylimidazolidin-2-one or 1,3-dimethylhexahydropyrimid-2-one; ketone or keto alcohol such as acetone, methylethylketone, 2-methyl-2-hydroxypentan-4-one; cyclic ether such as tetrahydrofuran or dioxane; mono-, oligo- or poly-alkylene glycol or thioglycol having a (C2 to C6) alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol or polypropylene glycol; polyol such as triol such as glycerine or hexane-1,2,6-triol; (C1 to C4) monoalkyl ether of polyhydric alcohol such as ethylene glycol monomethyl ether or ethylene glycol monoethyl ether, diethylene glycol monomethyl ether or diethylene glycol monoethyl ether or diethylene glycol monobutyl ether, or triethylene glycol monomethyl ether or triethylene glycol monoethyl ether; gamma-butyrolactone, dimethylsulfoxide or the like.

Said water-soluble organic solvent is preferably isopropanol, glycerine, mono- di- or tri-ethylene glycol, dipropylene glycol, 2-pyrolidone or N-methyl-2-pyrolidone, and more preferably isopropanol, glycerine, diethylene glycol or 2-pyrolidone. These water-soluble organic solvents are used alone or as a mixture thereof.

The antiseptic and fungicide includes, for example, an organic sulfur-based, organic nitrogen-sulfur-based, organic halogen-based, haloallylsulfone-based, iodopropargyl-based, N-haloalkylthio-based, benzothiazole-based, nitrile-based, pyridine-based, 8-oxyquinoline-based, isothiazoline-based, dithiol-based, pyridineoxide-based, nitropropane-based, organic tin-based, phenol-based, quaternary ammonium salt-based, triazine-based, thiadiazine-based, anilide-based, adamantane-based, dithiocarbamate-based, brominated indanone-based, benzyl bromoacetate-based or inorganic salt-based compound or the like. The organic halogen-based compound includes, for example, sodium pentachlorophenol; the pyridineoxide-based compound includes, for example, sodium 2-pyridinethiol-1-oxide; and the isothiazoline-based compound includes, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride or the like. The other antiseptic and fungicide includes, for example, sodium acetate, sodium sorbate, sodium benzoate or the like. The other specific examples of the antiseptic and fungicide preferably include, for example, Proxel® GXL(S) and Proxel® XL-2(S) which are trade names and manufactured by Avecia Corp., and the like.

As the pH adjuster, any substance can be used as long as it can control the pH of the ink in the range of 6.0 to 11.0 for the purpose of improving storage stability of the ink. It includes, for example, alkanolamine such as diethanolamine or triethanolamine; alkali metal hydroxide such as lithium hydroxide, sodium hydroxide or potassium hydroxide; ammonium hydroxide; alkali metal carbonate such as lithium carbonate, sodium carbonate or potassium carbonate; or the like.

The chelating agent includes, for example, sodium ethylenediamine tetraacetate, sodium nitrilo triacetate, sodium hydroxyethylethylenediamine triacetate, sodium diethylenetriamine pentaacetate, sodium uracil diacetate or the like. The rust-preventive agent includes, for example, acidic sulfite salt, sodium thiosulfate, ammonium thioglycolate, diisopropylammonium nitrite, pentaerythritol tetranitrate, dicyclohexylammonium nitrite or the like.

As the ultraviolet absorber, for example, benzophenone compounds, benzotriazole compounds, cinnamic acid compounds, triazine compounds, stilbene compounds, or compounds which absorb ultraviolet rays and radiate fluorescence typified by benzoxazole compounds, so called fluorescent brightening agent, can be used.

The viscosity modifier includes, besides a water-soluble organic solvent, water-soluble polymer compounds such as, for example, polyvinyl alcohol, cellulose derivatives, polyamine and polyimine.

The dye dissolving agent includes, for example, urea, ε-caprolactam, ethylene carbonate and the like.

The anti-fading agent is used for the purpose of improving storage stability of images. As the anti-fading agent, various organic and metal complex based anti-fading agents can be used. The organic anti-fading agent includes hydroquinones, alkoxyphenols, dialkoxyphenols, phenols, anilines, amines, indanes, chromans, alkoxyanilines, heterocycles or the like, and the metal complex based anti-fading agent includes nickel complexes, zinc complexes or the like.

The surface tension modifier includes surfactants, for example, anionic surfactants, amphoteric surfactants, cationic surfactants, nonionic surfactants and the like. The anionic surfactants include alkylsulfocarboxylic acid salt, α-olefin sulfonate, polyoxyethylene alkylether acetate, N-acylamino acid and salts thereof, N-acylmethyltaurine salts, alkylsulfate polyoxyalkylether sulfate, alkylsulfate polyoxyethylene alkylether phosphate, rosin acid soap, castor oil sulfate, lauryl alcohol sulfate salts, alkyl phenol phosphate ester, alkyl phosphate ester, alkyl allylsulfonate, diethyl sulfosuccinate, diethylhexyl sulfosuccinate, dioctyl sulfosuccinate or the like. The cationic surfactants include 2-vinylpyridine derivatives, poly(4-vinylpyridine) derivatives or the like. The amphoteric surfactants include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, imidazoline derivatives or the like. The nonionic surfactants include ethers such as polyoxyethylene nonylphenyl ether, polyoxyethylene octylphenyl ether, polyoxyethylene dodecylphenyl ether, polyoxyethylene octylphenyl ether, polyoxyethylene oleyl ether, polyoxyethylene lauryl ether or polyoxyethylene alkyl ether; polyoxyethylene oleic acid; esters such as polyoxyethylene oleic acid ester, polyoxyethylene distearate, sorbitan laurate, sorbitan monostearate, sorbitan monooleate, sorbitan sesquioleate, polyoxyethylene monooleate or polyoxyethylene stearate; acetylene glycols such as 2,4,7,9-tetramethyl-5-decyne-4,7-diol, 3,6-dimethyl-4-octyne-3,6-diol, 3,5-dimethyl-1-hexyn-3-ol (for example, Surfynol® 104, 82 and 465, and Olfine®STG manufactured by Nissin Chemical Industry Co., Ltd. and the like); and the like.

As the antifoaming agent, a compound of highly oxidized oil, glycerin fatty acid ester, fluorine or silicone is used if required.

These ink preparation agents are used alone or as a mixture thereof. In addition, the surface tension of the ink of the present invention is typically 25 to 70 mN/m and more preferably 25 to 60 mN/m. Further, the viscosity of the ink of the present invention is preferably 30 mPa·s or less. Furthermore, it is preferably adjusted to 20 mPa·s or less.

In producing the ink of the present invention, the sequence order of dissolving the agents is not limited in particular. In preparing the ink, water to be used is preferably one having a small content of impurities, such as ion-exchanged water or distilled water. In addition, foreign substances may be, if required, removed by microfiltration using a membrane filter or the like. In the case that the ink is used for ink for ink jet printer, microfiltration is preferably carried out. The pore size of a filter for microfiltration is typically 1 micron to 0.1 micron and preferably 0.8 micron to 0.2 micron.

The ink of the present invention can be used to form not only single color images but also full color images. In order to form full color images, the ink of the present invention can be used for an ink set of three primary colors comprising of a magenta ink, a yellow ink and the cyan ink of the present invention, as well as an ink set of four colors where a black ink is added to the above three primary colors. Further, in order to form images with high resolution, the ink of the present invention can be used for an ink set using the cyan ink of the present invention together with a light magenta ink, a blue ink, a green ink, an orange ink, a dark yellow ink, a gray ink and/or the like.

Various coloring matters can be used in the above yellow ink. They include, for example, arylazo dyes having an aryl compound such as a phenols, a naphthols or an anilines as a coupling component (hereinafter, referred to as coupler component), or heteroaryl azo dyes having a heterocycle compound such as pyrazolone and pyridone, and besides the azo dyes, benzylidene dyes; methine dyes such as monomethine oxonol dye; quinone dyes such as naphthoquinone dye and anthraquinone dye; and the like. In addition, dye species other than them can include quinophthalone dye, nitro nitroso dye, acridine dye, acridinone dye, and the like.

Various coloring matters can be used in the above magenta ink. It can include, for example, aryl azo dyes having an aryl compound such as a phenol, a naphthol or/and an aniline as a coupler component; heteroazo dyes having the above aryl compound as a coupler component; azo methine dyes having a pyrazolone or a pyrazolotriazole as a coupler component, and besides the azo dyes, methine dyes such as arylidene dye, styryl dye, merocyanine dye, cyanine dye or oxonol dye; carbonium dyes such as diphenylmethane dye, triphenylmethane dye or xanthene dye; quinone dyes such as naphthoquinone, anthraquinone or anthrapyridone; condensed polycyclic dyes such as dioxazine dye; and the like.

As the above coloring matters, a coloring matter can be used which exhibits each color of yellow, magenta and cyan only after the chromophore is partially dissociated, and its counter cation can be an inorganic cation such as alkali metal and ammonium or an organic cation such as pyridinium or quaternary ammonium salt. Further, it can be a polymer cation having such a cation in the partial structure.

The black coloring matter in the above black ink can include disazo, trisazo or tetraazo dyes as well as a of carbon black dispersion.

The ink of the present invention can be used in recording methods of impress printing, copying, marking, writing, drafting, stamping and the like, and is suitably used especially for a method of inkjet impress printing.

In the inkjet recording method of the present invention, energy is supplied to the ink prepared above to discharge ink droplets on an image receiving material for formation of images. The image receiving material (also optionally referred to as color-receiving material or record-receiving material in the present invention) can include known image receiving materials, i.e., plain paper, resin coating paper, inkjet special paper, glossy paper, glossy film, common use paper for electrophotography, fiber and cloth (such as cellulose, nylon and wool), glass, metal, ceramics, leather or the like.

For the purpose of providing formed images with glossiness and water fastness and improving weatherability, a polymer micro particle dispersion (also referred to as polymeric latex) may be used. The polymeric latex may be provided to the image receiving material (including record-receiving material) before or after formation of images, or at the same time as formation of images. Therefore, a liquid of polymeric latex alone may be applied to image receiving materials before or after formation of images, or image receiving materials containing polymeric latex in advance may be used, otherwise polymeric latex may be mixed in an ink and the ink may be applied to image receiving materials.

The colored product of the present invention is a product where an image receiving material is colored with the above porphyrazine coloring matter of the present invention or an ink or the like containing this. The color-receiving material is not limited in particular as long as it is an article which can be colored with the porphyrazine coloring matter of the present invention. It includes, for example, paper, communication sheet such as film, fiber and cloth (such as cellulose, nylon and wool), leather, substrate for color filter, and the like. Communication sheet is preferably subjected to surface treatment, and specifically provided with an ink receiving layer on a substrate such as paper, synthetic paper or film. The ink receiving layer can be provided by, for example, impregnating or coating a cation polymer on the above substrate, or by coating inorganic particulates which can absorb the coloring matter in the ink, such as porous silica, aluminasol or special ceramics, together with a hydrophilic property polymer such as polyvinyl alcohol or polyvinylpyrrolidone on the surface of the above substrate. Paper provided with such an ink receiving layer is usually called inkjet special paper (film), glossy paper (film) or the like. Among them, inkjet special paper coated, on the surface of the substrate, with inorganic particulates which can absorb the coloring matter in the ink, such as porous silica, aluminasol or special ceramics, is regarded to be susceptible to gases having oxidizing effect in the air such as ozone gas.

For example, some representative examples of such commercially available paper include Pictorico® (which is a trade name, manufactured by Asahi Glass Co., Ltd.), Professional Photopaper, Super Photopaper and Matte Photopaper (which are all trade names, manufactured by Canon Inc.), Photo Paper CRISPIA® <high-glossy>, Photo Paper <Glossy> and Photo Matte Paper (which are all trade names, manufactured by Seiko-Epson Corporation), Advanced Photo Paper (glossy), Premium Glossy Film and Photo Paper (which are all trade names, manufactured by Hewlett Packard Japan, Ltd.), PhotoLikeQP (which is a trade name, manufactured by KONICA Corporation), High Quality Coated Paper and Glossy Photo Paper (which are all trade names, manufactured by Sony Corporation) and the like. In addition, plain paper can be naturally used.

Any coloring method may be used to obtain the above colored product of the present invention. One of preferable coloring methods is a method where a color-receiving material is colored (recorded) with the above ink using an ink jet printer. Color-receiving material is not limited in particular, and it is the above record-receiving material, or can be any other article as long as it can be colored by an ink jet printer.

In order to record on an image receiving material (which is a record-receiving material in this case) by the inkjet recording method of the present invention, for example, a container containing the above ink may be set in a predetermined position in the ink jet printer and recording may be performed on a record-receiving material in a usual manner. The ink jet printer includes, for example, a piezo inkjet printer utilizing mechanical vibration, a Bubble Jet® (registered trademark) type printer utilizing bubbles generated by heating, and the like.

The ink according to the present invention shows no precipitation or/and no separation during storage. In addition, the ink according to the present invention has good discharging property and does not cause injector (ink head) clogging when used in inkjet printing. The ink according to the present invention shows no change in physical property when used in printing for relatively long hours and under constant recirculation by a continuous inkjet printer, or in intermittent printing by an on-demand printer or the like.

The ink of the present invention is a vivid cyan color and recorded matters excellent particularly in ozone fastness and also excellent in light fastness and water fastness can be obtained by using said ink. It can be possible by using the ink of the present invention for an ink set of dark and light cyan inks and further together with other inks of yellow and magenta, if needed, further, other inks of green, red, orange, blue and the like which are excellent in ozone fastness, light fastness and water fastness, to exhibit color tones in a wide visible region and to obtain colored matters (recorded matters and the like) excellent in ozone fastness and also in light fastness and water fastness.

EXAMPLES

Hereinafter, the present invention will be further explained more specifically by Examples. In this connection, "part" and "%" in context are based on mass unless otherwise specifically noted. Furthermore, reactions were all carried out under stirring unless otherwise specifically noted.

In addition, the compounds of the above formula (1) synthesized in Examples are all mixtures and contain the above positional isomers of the nitrogen-containing heteroaromatic ring, positional isomers of nitrogen atom of the nitrogen-containing heteroaromatic ring, compounds with various proportions of the benzo ring/the nitrogen-containing heteroaromatic ring corresponding to A to D of the formula (1), α/β positional isomers of the substituted or unsubstituted sulfamoyl group in the benzo ring, and the like, unless otherwise specifically noted. As described above, it is extremely difficult to isolate a certain single compound from these isomer mixtures and determine the structure, so A to D are shown with broken lines in the chemical structural formulas.

The phrase "(20% to the solution)" in salting out described in Examples means that 20% mass of sodium chloride is used to the whole liquid volume (based on mass) of the coloring matter solution or the coloring matter suspension which is the object of salting out.

In addition, measurement of λmax of synthesis compounds is carried out by the following method.

Method of Measuring λmax

Apparatus: UV-2100 (manufactured by Shimadzu Corporation)

1) Measurement in Aqueous Solution

In ion-exchanged water, 0.14 g of a sample was dissolved, the pH was adjusted to the range of 7.0 to 9.0 with sodium hydroxide, and then the volume was fixed with a 500 ml measuring flask. With a whole pipette, 10 ml was taken by measuring from this volume-fixed solution into a 100 ml measuring flask, and the volume was fixed with ion-exchanged water to 100 ml to use for measurement.

2) Measurement in Pyridine

Pyridine was added to several mg of the sample until the solid could not be seen by visual observation, and this was measured.

In this connection, all the compounds measured in pyridine had extremely low solubility in solvent, so the measured value is a reference value.

In addition, with regard to the compounds obtained in the following Examples, each number of the pyridine ring and the benzene ring in four 6-membered aromatic rings of A to D shown with broken lines in the formula (1) and the like indicates the average value of the obtained compounds.

Example 1

(1) Synthesis of a mixture of copper tribenzo(2,3-pyrido)porphyrazine and copper dibenzobis(2,3-pyrido)porphyrazine (a mixture containing the both in an equimolar ratio; a compound where out of four 6-membered aromatic rings of A to D in the following formula (6), 1.5 are pyridine rings fused at the 2-position and the 3-position and the rest 2.5 are benzene rings)

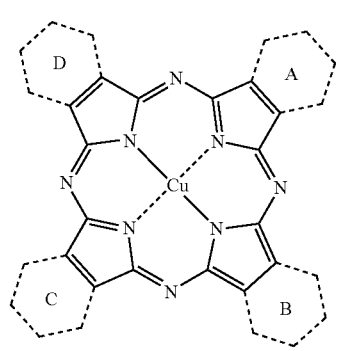

(6)

In a four-neck flask, 250 parts of sulfolane, 18.4 parts of phthalimide, 12.5 parts of quinolinic acid, 72.0 parts of urea, 8.8 parts of copper (II) chloride dihydrate (purity: 97.0%) and 1.0 part of ammonium molybdate were added, raised to 200° C. in temperature and maintained at the same temperature for 5 hours. After completion of the reaction, the reaction solution was cooled to 65° C. and 200 parts of methanol was added thereto and precipitated crystal was then filtered. The obtained crystal was washed with 150 parts of methanol followed by 200 parts of hot water and then dried to obtain 72.2 parts of a wet cake. The whole volume of the obtained wet cake was added in 500 parts of 5% hydrochloric acid, raised to 60° C. in temperature and maintained at the same temperature for 1 hour. The crystal was filtered and washed with 200 parts of water. Next, the whole volume of the obtained wet cake was added in 500 parts of 10% ammonia water, the liquid temperature was raised to 60° C. and maintained at the same temperature for 1 hour, and then the crystal was separated by filtration. The obtained crystal was washed with 300 parts of water and 100 parts of methanol to obtain 33.6 parts of a wet cake. The obtained wet cake was dried at 80° C. to obtain 19.8 parts of a mixture of copper tribenzo(2,3-pyrido)porphyrazine and copper dibenzobis(2,3-pyrido)porphyrazine as a blue crystal.

λmax: 663.5 nm (in pyridine)

(2) Synthesis of a mixture of copper tribenzo(2,3-pyrido)porphyrazine trisulfonylchloride and copper dibenzobis(2,3-pyrido)porphyrazine disulfonylchloride (a compound of the following formula (3) where out of four 6-membered aromatic rings of A to D, 1.5 are pyridine rings fused at the 2-position and the 3-position and the rest 2.5 are benzene rings, and n is 2.5)

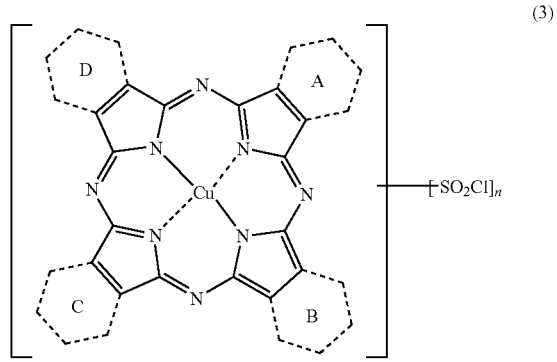

(3)

In 46.2 parts of chlorosulfonic acid, 5.8 parts of the mixture of copper tribenzo(2,3-pyrido)porphyrazine and copper dibenzobis(2,3-pyrido)porphyrazine which is obtained in Example 1-(1) was gradually added at 60° C. or less while stirring and the reaction was carried out at 140° C. for 4 hours. Next, the reaction solution was cooled to 70° C., whereto 17.9 parts of thionyl chloride was then added dropwise over 30 minutes, and the reaction was carried out at 70° C. for 3 hours. The obtained reaction solution was cooled to 30° C. or less and slowly poured in 800 parts of ice water to precipitate a crystal, which was then separated by filtration and washed with 200 parts of cold water to obtain 40.0 parts of a wet cake of a mixture of copper tribenzo(2,3-pyrido)porphyrazine trisulfonylchloride and copper dibenzobis(2,3-pyrido)porphyrazine disulfonylchloride.

(3) Synthesis of the following formula (12) (a compound of the formula (4) where X is a 3,6,8-trisulfonaphthalen-1-ylamino group, Y is a 2-carboxyanilino group, and E is ethylene)

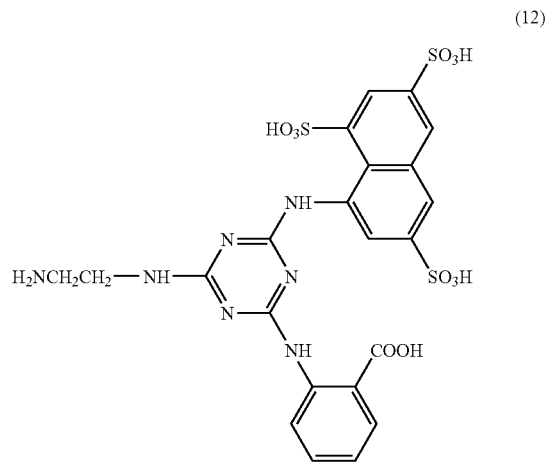

(12)

In 150 parts of ice water, 18.4 parts of cyanuric chloride and 0.02 parts of LEOCOL®TD-90 (which is a trade name of surfactant, manufactured by Lion Corporation) were added and stirred at 10° C. or less for 30 minutes. Next, 51.6 parts of 8-aminonaphthalene-1,3,6-trisulfonic acid (purity: 91.4%) was added thereto and the reaction was carried out at 0 to 10° C. for 1 hour 50 minutes and at 20 to 25° C. for 1 hour 15 minutes while maintaining pH 2.0 to 3.0 using a 10% aqueous sodium hydroxide solution. Next, 14.1 parts of 2-aminobenzoic acid was added to the obtained reaction solution and the reaction was carried out at 20° C. for 2 hours and at 40° C. for 2 hours while maintaining pH 7.0 to 8.0 using a 10% aqueous sodium hydroxide solution. The reaction solution was raised to 60° C. in temperature and 60 parts of ethylenediamine was added dropwise thereto and the resulting liquid was then stirred overnight. While maintaining the temperature at 20° C. or less by adding ice there, concentrated hydrochloric acid was added to adjust to pH 1.0 to carry out the reaction. At this time, the liquid volume was 1,500 parts. To this reaction solution, 300 parts of sodium chloride was added over 15 minutes and then stirred for 15 minutes. The precipitated crystal was separated by filtration to obtain 138.2 parts of a wet cake. The obtained wet cake was added in 500 parts of water and dissolved by adjusting to pH 10.0 using a 10% aqueous sodium hydroxide solution. At this time, the liquid volume was 700 parts. Concentrated hydrochloric acid was added to this solution to adjust the pH to 1.0, and 140 parts of sodium chloride was added thereto over 20 minutes and then stirred for 20 minutes. The precipitated crystal was separated by filtration to obtain 160.0 parts of a wet cake. The obtained wet cake was added in a mixed liquid of 1,250 parts of methanol and 125 parts of water, and the resulting liquid was stirred at 50° C. for 1 hour followed by filtration to separate a crystal, which is then washed with methanol to obtain 104.8 parts of a wet cake. The obtained wet cake was dried to obtain 64.3 parts of a compound of the above formula (12) as a white powder.

(4) Synthesis of the following formula (13) (a mixture of compounds of No. 1, No. 2 and No. 3 in Table 1: a compound of the above formula (1) where out of four 6-membered aromatic rings of A to D, 1.5 is pyridine rings fused at the 2-position and the 3-position and the rest 2.5 are benzene rings, X is a 3,6,8-trisulfonaphthalen-1-ylamino group, Y is a 2-carboxyanilino group, and E is ethylene).

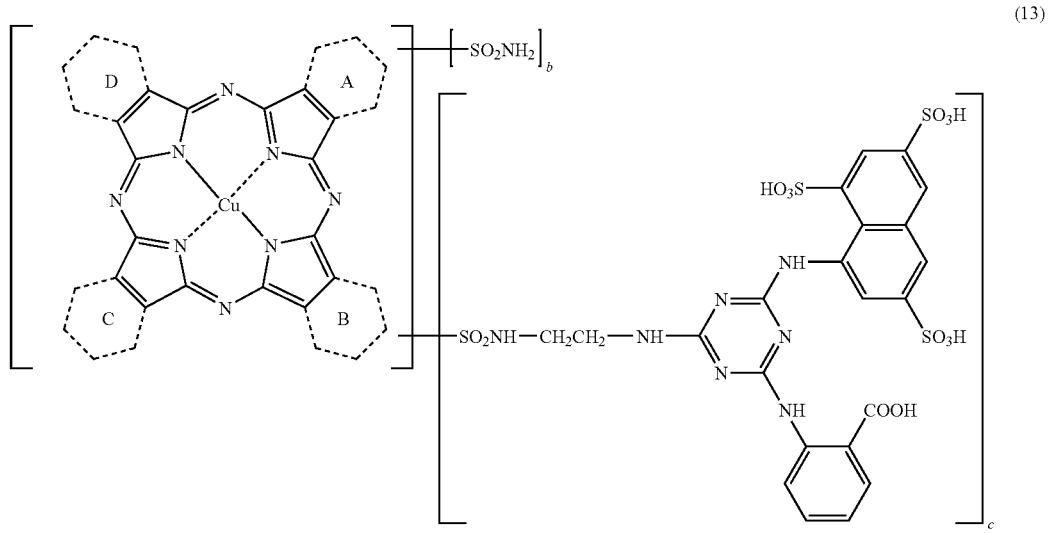

(13)

To 100 parts of ice, 40.0 parts of the wet cake of copper benzo(2,3-pyrido)porphyrazine sulfonylchloride obtained in Example 1-(2) was added and water was added to adjust the liquid volume to 400 parts and the resulting liquid, was stirred at 5° C. or less for 15 minutes to give a suspension. A solution of 13.16 parts of the compound of the formula (12) obtained in the above (3) dissolving in 65 parts of hot water and 6 parts of 28% ammonia water was added to said suspension. After the addition, the pH was adjusted to 9.0 with 28% ammonia water. While maintaining the same pH, the liquid temperature was raised to 20° C. over 10 minutes and the liquid was maintained at the same temperature for 8 hours to carry out the reaction. The liquid volume at this time was 800 parts. The resulting reaction solution was raised to 50° C., 160 parts of sodium chloride was added thereto, and said liquid was stirred for 10 minutes and then adjusted to pH 1.0 with concentrated hydrochloric acid over 5 minutes followed by precipitation of a crystal, which was separated by filtration to obtain 85.2 parts of a wet cake. Water was added to 85.2 parts of the obtained wet cake to make the liquid volume 520 parts, the liquid temperature was raised to 50° C. and the pH was adjusted to 10.0 with a 25% aqueous sodium hydroxide solution to dissolve the wet cake completely. To the resulting solution, 104 parts of sodium chloride was added and stirred for 15 minutes, and then the pH was adjusted to 1.2 with hydrochloric acid over 5 minutes. The precipitate was separated by filtration to obtain 68.0 parts of a wet cake. In 440 parts of methanol, 68.0 parts of the obtained wet cake was added and then 44 parts of water were added and stirred at 50° C. for 1 hour. The resulting suspension was filtered to separate a wet cake, which was then washed with methanol and dried to obtain 13.0 parts of a blue powder.

λmax: 607 nm (in an aqueous solution)

Example 2

(1) Synthesis of the following formula (14) (a compound of the formula (4) where X is a 3,6,8-trisulfonaphthalen-1-ylamino group, Y is a 4-carboxyanilino group, and E is ethylene)

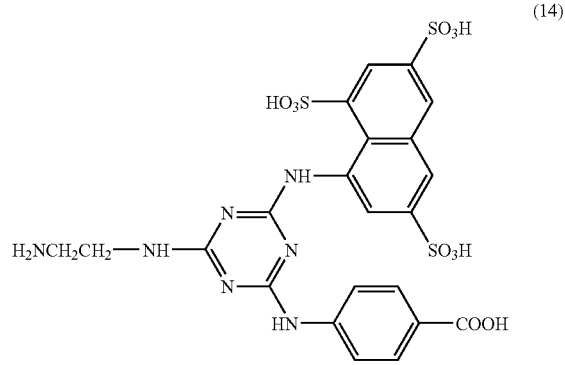

(14)

In 150 parts of ice water, 18.4 parts of cyanuric chloride and 0.02 parts of LEOCOL®TD-90 (which is a trade name of a surfactant, manufactured by Lion Corporation) were added to obtain a mixed liquid, which was then stirred at 10° C. or less for 30 minutes. Next, 51.6 parts of 8-aminonaphthalene-1,3,6-trisulfonic acid (purity: 91.4%) was added thereto, and then the reaction was carried out at 0 to 10° C. for 1 hour 50 minutes and at 20 to 25° C. for 1 hour 15 minutes while maintaining the pH at 2.0 to 3.0 using a 10% aqueous sodium hydroxide solution. Next, 14.1 parts of 4-aminobenzoic acid was added to said reaction solution, and the reaction was carried out at 20° C. for 2 hours and at 40° C. for 2 hours while maintaining the pH at 7.0 to 8.0 using a 10% aqueous sodium hydroxide solution. The liquid temperature was then raised to 60° C. and 60 parts of ethylenediamine was added dropwise thereto. The resulting liquid was stirred overnight to carry out the reaction. After that, the pH of said reaction solution was adjusted to 1.0 using concentrated hydrochloric acid. During this, ice was appropriately added and said liquid temperature was maintained at 20° C. At this time, the liquid volume was 1,250 parts. To this reaction solution, 250 parts of sodium chloride added over 15 minutes and the resulting liquid was stirred for 15 minutes to precipitate a crystal. The precipitated crystal was separated by filtration to obtain 368.2 parts of a wet cake. The obtained wet cake was put into a beaker, 700 parts of water added thereto, and the pH of the resulting liquid was adjusted to 10.0 using a 10% aqueous sodium hydroxide solution to dissolve the wet cake. At this time, the liquid volume was 1,000 parts. The pH of this solution was adjusted to 1.0 using concentrated hydrochloric acid and then 200 parts of sodium chloride was added thereto over 20 minutes, and the resulting liquid was stirred for 20 minutes to precipitate a crystal. The precipitated crystal was separated by filtration to obtain 236.2 parts of a wet cake. The obtained wet cake was added to 1,250 parts of methanol and 125 parts of water was further added thereto, and the resulting liquid was stirred at 50° C. for 1 hour followed by filtration. Obtained was 196.5 parts of a wet cake. The obtained wet cake was dried to obtain 58.4 parts of a compound of the above formula (14) as a white powder.

(2) Synthesis of the following formula (15) (a mixture of No. 5, No. 6 and No. 7 in Table 1: a compound of the above formula (1) where out of four 6-membered aromatic rings of A to D, 1.5 are pyridine rings fused at the 2-position and the 3-position and 2.5 are benzene rings, X is a 3,6,8-trisulfonaphthalen-1-ylamino group, Y is a 4-carboxyanilino group, and E is ethylene).

(15)

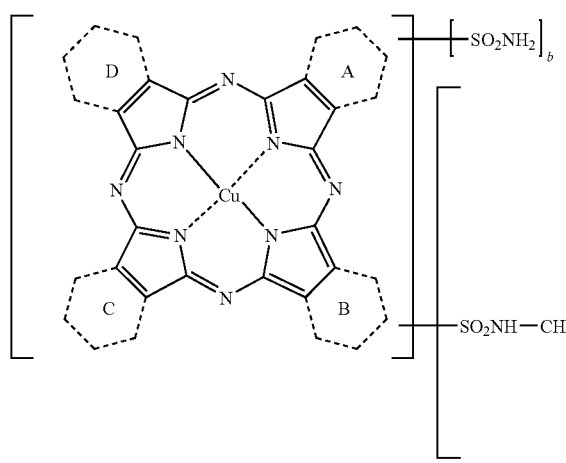 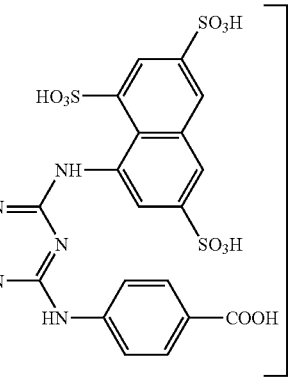

To 100 parts of ice, 40.0 parts of a wet cake of copper benzo(2,3-pyrido)porphyrazine sulfonylchloride obtained in the same manner as in Example 1-(2) was added and water was further added to adjust the liquid volume to 400 parts, and the resulting liquid was stirred at 5° C. or less for 15 minutes to obtain a suspension. A solution of 13.1 parts of the compound of formula (14) obtained in the above (1) dissolving in 65 parts of hot water and 6 parts of 28% ammonia water was added to said suspension. After the addition, the pH was adjusted to 9.0 with 28% ammonia water. While maintaining the same pH, the liquid temperature was raised to 20° C. over 10 minutes and the liquid was maintained at the same temperature for 8 hours to carry out the reaction. The liquid volume at this time was 600 parts. The obtained reaction solution was raised to 50° C. in temperature and 120 parts of sodium chloride was added thereto, and the resulting liquid was stirred for 10 minutes. Next, the pH was adjusted to 0.7 with hydrochloric acid over 5 minutes to precipitate a crystal, which was then separated by filtration to obtain 120 parts of a wet cake. Water was added to 120 parts of the obtained wet cake to adjust the liquid volume to 600 parts, the liquid temperature was raised to 60° C. and the pH was adjusted to 9.5 with a 25% aqueous sodium hydroxide solution to dissolve the wet cake completely. To said solution, 120 parts of sodium chloride was added and stirred for 15 minutes. The pH was adjusted to 2.0 with hydrochloric acid over 5 minutes to precipitate a crystal, which was then separated by filtration to obtain 82.6 parts of a wet cake. In 400 parts of methanol, 82.6 parts of the obtained wet cake was added and 40 parts of water was further added thereto. The obtained mixture was stirred at 50° C. for 1 hour to obtain a suspension, which was then filtered to separate a wet cake, which was then washed with methanol and dried to obtain 10.4 parts of a blue powder.
λmax: 600 nm (in an aqueous solution)

Example 3

(1) Synthesis of the following formula (16) (a compound of the formula (4) where X and Y are 3-sulfoanilino groups and E is ethylene)

(16)

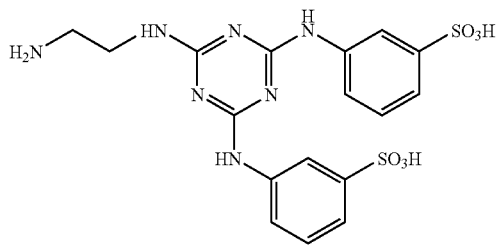

In 150 parts of ice water, 18.5 parts of cyanuric chloride and 0.02 parts of LEOCOL®TD-90 (which is a trade name of a surfactant, manufactured by Lion Corporation) were added to obtain a mixed liquid, which was stirred at 10° C. or less for 30 minutes. Next, 34.8 parts of metanilic acid (purity: 99.3%) was added thereto, and while adjusting the pH of the obtained liquid to 3 to 4 using a 13% aqueous sodium hydroxide solution, said liquid was stirred at 10° C. or less for 1 hour. Next, 100 parts of ice was added thereto, the liquid temperature was adjusted to 0 to 5° C., and then 60 parts of ethylenediamine was added at a stroke to the liquid. The resulting liquid was stirred overnight at room temperature, and then the pH was adjusted to 1 using concentrated hydrochloric acid. After stirring for a while, the liquid was salted out with sodium chloride (20% to the liquid) to give a precipitate, which was separated by filtration to obtain 104 parts of a wet cake. The obtained wet cake was put into a beaker, 400 parts of water was added, and the pH of the resulting liquid was adjusted to 8 using a 13% aqueous sodium hydroxide solution to dissolve the wet cake. Subsequently, the pH of the resulting liquid was adjusted to 1 using concentrated hydrochloric acid and then the liquid was salted out with sodium chloride (20% to the liquid) to give a precipitate, which was then separated by filtration to obtain 116 parts of a wet cake. The obtained wet cake was added to 300 parts of methanol and then 30 parts of water was added thereto. The resulting suspension was stirred at 50° C. for 1 hour and then filtered to obtain 73 parts of a wet cake. The obtained wet cake was dried to obtain 45.7 parts of a compound of the above formula (16) as a white powder.

(2) Synthesis of the following formula (17) (a mixture of No. 9, No. 10 and No. 11 in Table 1: a compound of the above formula (1) where out of four 6-membered aromatic rings of A to D, 1.5 are pyridine rings fused at the 2-position and the 3-position and the rest 2.5 are benzene rings, X and Y are 3-sulfoanilino groups, and E is ethylene).

(17)

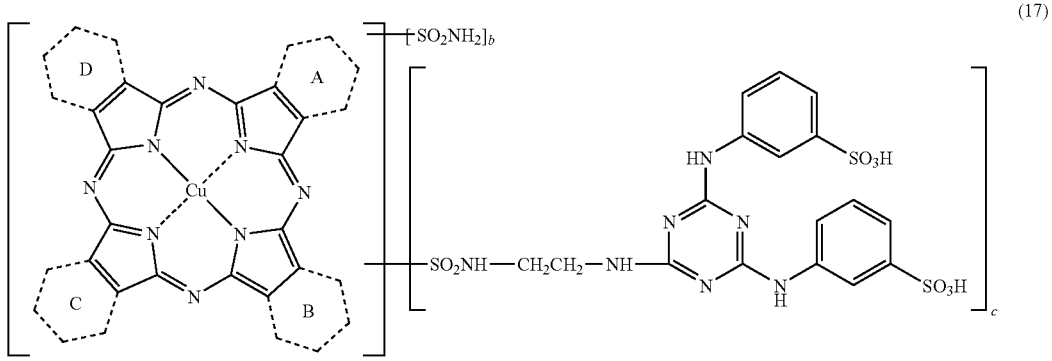

To 100 parts of ice, 40.0 parts of the wet cake of copper benzo(2,3-pyrido)porphyrazine sulfonylchloride obtained in the same manner as in Example 1-(2) was added, and water was added thereto to adjust the liquid volume to 400 parts. The resulting liquid was stirred at 5° C. or less for 15 minutes to obtain a suspension. A solution of 18.7 parts of the compound of the formula (16) obtained in the above (1) dissolving in 100 parts of water and ammonia water was added to said suspension. After the addition, the pH was adjusted to 9.0 with 28% ammonia water. While maintaining the same pH, the liquid temperature was raised to 20° C. over 10 minutes. The liquid was maintained at the same temperature for 8 hours to carry out the reaction. Subsequently, the temperature was adjusted to 60° C. and then the liquid was salted out with sodium chloride (20% to the liquid) to obtain 85 parts of a wet cake. The obtained wet cake was put into a beaker, 300 parts of water was added thereto, and the pH of said liquid was adjusted to 11 using a 13% aqueous sodium hydroxide solution to dissolve the wet cake. The pH of said solution was adjusted to 1 using concentrated hydrochloric acid and then said solution was salted out with sodium chloride (20% to the liquid) to give a precipitate, which was then separated by filtration to obtain 83 parts of a wet cake. The obtained wet cake was added to 300 parts of methanol and then 30 parts of water was added thereto, followed by stirring at 60° C. for 1 hour, then filtration, washing with methanol and drying to obtain 14.5 parts of a blue powder.

λmax: 675 nm (in an aqueous solution)

Example 4

(1) Synthesis of the following formula (18) (a compound of the formula (4) where X is a 6-sulfonaphthalen-2-ylamino group, Y is a 4-sulfoanilino group and E is ethylene)

(18)

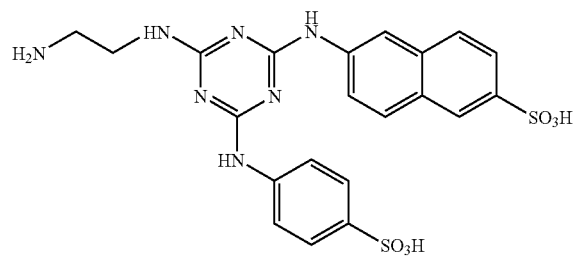

Into a beaker, 18.5 parts of cyanuric chloride, 0.02 parts of LEOCOL®TD-90 (which is a trade name of a surfactant, manufactured by Lion Corporation), 100 parts of ice and 50 parts of water were put and stirred at 10° C. or less for 30 minutes. Next, 41.9 parts of 6-aminonaphthalene-2-sulfonic acid (purity: 53.3%) was added thereto. Next, while adjusting the pH of the resulting liquid to 3 to 4 using a 13% aqueous sodium hydroxide solution, said liquid was stirred at 10° C. or less for 3 hours. There was added 17.5 parts of 4-aminobenzenesulfonic acid (purity: 99.0%), and then while adjusting the pH of the resulting liquid to 6 to 9 using a 13% aqueous sodium hydroxide solution, the resulting liquid was stirred at room temperature for 9 hours. Next, 100 parts of ice was added thereto to adjust the liquid temperature to 0 to 5° C. There was added 60 parts of ethylenediamine at a stroke. The resulting liquid was stirred overnight at room temperature and then the pH of said liquid was adjusted to 1 using concentrated hydrochloric acid. After stirring said liquid for a while, it was salted out with sodium chloride (20% to the liquid) to give a precipitate, which was separated by filtration to obtain 203 parts of a wet cake. The obtained wet cake was put into a beaker, 500 parts of water was added thereto, and then the pH of the resulting liquid was adjusted to 13 using a 13% aqueous sodium hydroxide solution to dissolve the wet cake. Subsequently, the pH of said solution was adjusted to 1 using concentrated hydrochloric acid and then said solution was salted out with sodium chloride (20% to the liquid) to give a precipitate, which was separated by filtration to obtain 131 parts of a wet cake. The obtained wet cake was put into a beaker, 260 parts of methanol and 26 parts of water were added thereto, and the resulting liquid was stirred at 50° C. for 1 hour followed by filtration to obtain 72 parts of a wet cake. The obtained wet cake was dried to obtain 58.92 parts of a compound of the formula (18) as a white solid.

(2) Synthesis of the following formula (19) (a mixture of No. 13, No. 14 and No. 15 in Table 1: a compound of the above formula (1) where out of four 6-membered aromatic rings of A to D, 1.5 are pyridine rings fused at the 2-position and the 3-position and the rest 2.5 are benzene rings, X is a 6-sulfonaphthalen-2-ylamino group, Y is a 4-sulfoanilino group and E is ethylene)

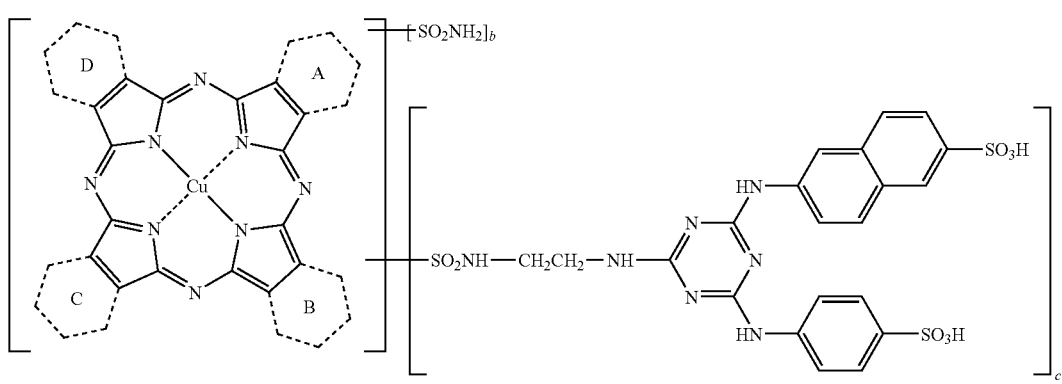

(19)

To 100 parts of ice, 40.0 parts of a wet cake of copper benzo(2,3-pyrido)porphyrazine sulfonylchloride obtained in the same manner as in Example 1-(2) was added. Next, water was added thereto to adjust the liquid volume to 400 parts, and the resulting liquid was stirred at 5° C. or less for 15 minutes to obtain a suspension. A solution of 36.1 parts of the compound of the formula (18) obtained in the above (1) dissolving with 100 parts of water and ammonia water was added to said suspension. After the addition, the pH of said liquid was adjusted to 9.0 with 28% ammonia water. While maintaining the same pH, the liquid temperature was raised to 20° C. over 10 minutes and the liquid was maintained at the same temperature for 12 hours. Subsequently, the liquid temperature was adjusted to 60° C. and then the liquid was salted out with sodium chloride (20% to the liquid) to give a precipitate, which was separated by filtration to obtain 131 parts of a wet cake. The obtained wet cake was put into a beaker, 400 parts of water was added thereto, and the pH of the resulting liquid was adjusted to 11 using a 13% aqueous sodium hydroxide solution to dissolve the wet cake. Subsequently, the pH was adjusted to 1 using concentrated hydrochloric acid and then the liquid was salted out with sodium chloride (20% to the liquid) to give a precipitate, which was then separated by filtration to obtain 95 parts of a wet cake. The obtained wet cake was added to 400 parts of methanol and then 40 parts of water was added thereto. The pH of said suspension was adjusted to 4 using a 13% aqueous sodium hydroxide solution and said suspension was stirred at 60° C. for 1 hour followed by filtration. The resulting wet cake was dried to obtain 22.36 parts of a blue powder.

λmax: 611 nm (in an aqueous solution)

Example 5

(1) Synthesis of the following formula (20) (a compound of the formula (4) where X is a 3-sulfoanilino group, Y is a 2-carboxy-4-sulfoanilino group and E is ethylene)

(20)

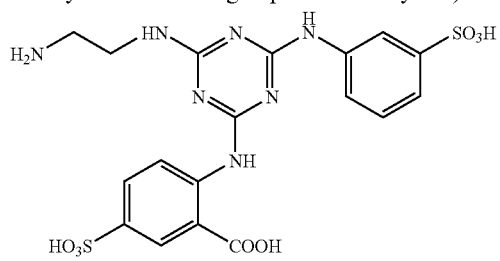

In 150 parts of ice water, 18.5 parts of cyanuric chloride and 0.02 parts of LEOCOL®TD-90 (which is a trade name of a surfactant, manufactured by Lion Corporation) were added and the resulting mixed liquid was stirred at 10° C. or less for 30 minutes. Next, 17.4 parts of 3-aminobenzenesulfonic acid (purity: 99.3%) was added thereto, and while adjusting the pH of the resulting liquid to 3 to 4 using a 13% aqueous sodium hydroxide solution, said liquid was stirred at 10° C. or less for 1 hour. Next, 24.6 parts of 5-sulfo anthranilic acid (purity: 88.4%) was added thereto, the pH of said liquid was adjusted to 6 to 9 using a 13% aqueous sodium hydroxide solution, and said liquid was stirred at 25 to 30° C. for 3 hours. Next, 100 parts of ice was added thereto to adjust the liquid temperature to 0 to 5° C. and then 60 parts of ethylenediamine was added thereto at a stroke. Said liquid was stirred overnight at room temperature and then the pH of said liquid was adjusted to 1 using concentrated hydrochloric acid. After stirring for a while, said liquid was salted out with sodium chloride (20% to the liquid) to give a precipitate, which was then separated by filtration to obtain 147 parts of a wet cake. The obtained wet cake was put into a beaker, 450 parts of water was added thereto and the pH of said liquid was adjusted to 7 using a 13% aqueous sodium hydroxide solution to dissolve the wet cake. Subsequently, the pH of said liquid was adjusted to 1 using concentrated hydrochloric acid and then said liquid was salted out with sodium chloride (20% to the liquid) to give a precipitate, which was then separated by filtration to obtain 140 parts of a wet cake. The obtained wet cake was added to 300 parts of methanol and then 30 parts of water was added thereto, and the resulting liquid was stirred at 50° C. for 1 hour and then filtered to obtain 85 parts of a wet cake. The obtained wet cake was dried to obtain 61.7 parts of a white solid.

(2) Synthesis of the following formula (21) (a mixture of No. 17, No. 18 and No. 19 in Table 1: a compound of the above formula (1) where out of four 6-membered aromatic rings of A to D, 1.5 are pyridine rings fused at the 2-position and the 3-position and the rest 2.5 are benzene rings, X is a 3-sulfoanilino group, Y is a 2-carboxy-4-sulfoanilino group and E is ethylene)

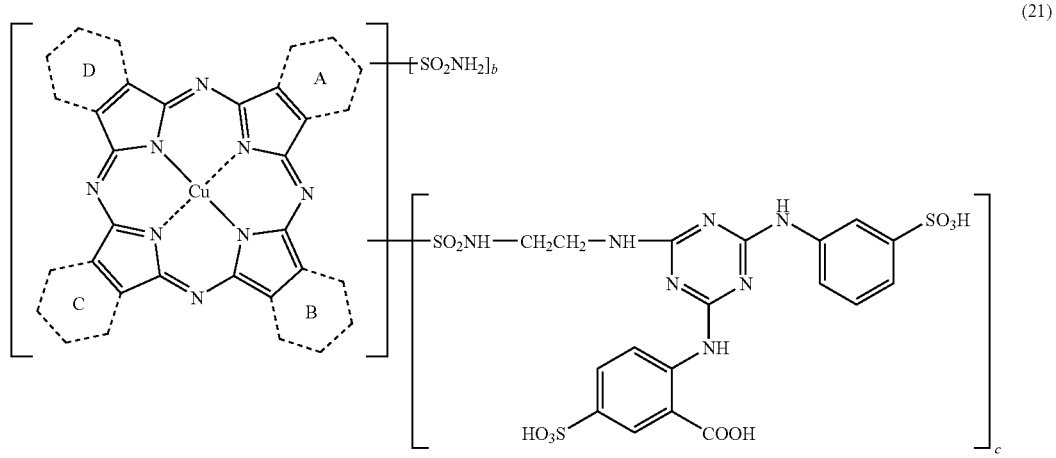

(21)

To 100 parts of ice, 40.0 parts of a wet cake of copper benzo(2,3-pyrido)porphyrazine sulfonylchloride obtained in the same manner as in Example 1-(2) was added, and water was added thereto to adjust the liquid volume to 400 parts. The resulting liquid was stirred at 5° C. or less for 15 minutes to give a suspension. A solution of 15.8 parts of the compound of the formula (20) obtained in the above (1) dissolving in 100 parts of hot water and 9 parts of 28% ammonia water was added to said suspension. After the addition, the pH was adjusted to 9.0 with 28% ammonia water while maintaining the same pH, the liquid temperature was raised to 20° C. over 10 minutes and the liquid was maintained at the same temperature for 8 hours to carry out the reaction. The liquid volume at this time was 500 parts. The resulting reaction solution was raised to 50° C. in temperature, 100 parts of sodium chloride was added and stirred for 10 minutes, and then the pH was adjusted to 0.6 with hydrochloric acid over 5 minutes to give a precipitate, which was then separated by filtration to obtain 88.2 parts of a wet cake. Water was added to 88.2 parts of the obtained wet cake to adjust the liquid volume to 400 parts, the liquid temperature was raised to 50° C., and the pH was adjusted to 9.4 with a 25% aqueous sodium hydroxide solution to dissolve the wet cake completely. To said solution, 80 parts of sodium chloride was added and stirred for 15 minutes, and then the pH was adjusted to 0.8 with hydrochloric acid over 5 minutes to give a precipitate, which was then separated by filtration to obtain 55.3 parts of a wet cake. In 440 parts of methanol, 55.3 parts of the obtained wet cake was added and 44 parts of water was further added thereto, and stirred at 50° C. for 1 hour to obtain a suspension. Said suspension was filtered to obtain a wet cake, which was then washed with methanol and dried to obtain 13.1 parts of a blue powder.

λmax: 609 nm (in an aqueous solution)

Example 6

(1) Synthesis of the following formula (22) (a compound of the formula (4) where X is a 3-sulfoanilino group, Y is a 4-sulfoanilino group and E is ethylene)

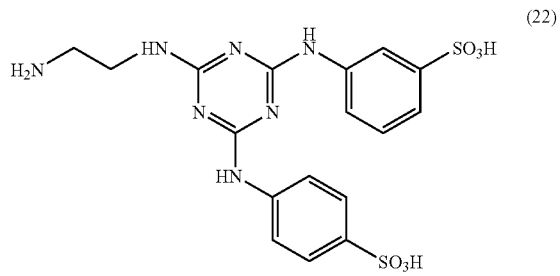

(22)

In 150 parts of ice water, 18.5 parts of cyanuric chloride and 0.02 parts of LEOCOL®TD-90 (which is a trade name of a surfactant, manufactured by Lion Corporation) were added and the resulting mixed liquid was stirred at 10° C. or less for 30 minutes. Next, 17.5 parts of 4-aminobenzenesulfonic acid (purity: 99.0%) was added thereto, and while adjusting the pH of the resulting liquid to 3 to 4 using a 13% aqueous sodium hydroxide solution, said liquid was stirred at 10° C. or less for 1 hour. Next, 17.4 parts of 3-aminobenzenesulfonic acid (purity: 99.3%) was added thereto, the pH of the resulting liquid was adjusted to 6 to 9 using a 13% aqueous sodium hydroxide solution, and the liquid was stirred at room temperature for 3 hours. Next, 100 parts of ice was added thereto, the liquid temperature was adjusted to 0 to 5° C., and then 60 parts of ethylenediamine was added thereto at a stroke. The resulting liquid was stirred overnight at room temperature and then the pH of the liquid was adjusted to 1 using concentrated hydrochloric acid. After stirring for a while, the liquid was salted out with sodium chloride (20% to the liquid) to give a pre cipitate, which was then separated by filtration to obtain 156 parts of a wet cake. The obtained wet cake was put into a beaker, 450 parts of water was added thereto, and the pH of the resulting liquid was adjusted to 11.5 using a 13% aqueous sodium hydroxide solution to dissolve the wet cake. Subsequently, the pH of the resulting solution was adjusted to 1 using concentrated hydrochloric acid and then the solution was salted out with sodium chloride to give a precipitate, which was then separated by filtration to obtain 180 parts of a wet cake. The obtained wet cake was added to 400 parts of methanol, and then 40 parts of water was added thereto and stirred at 50° C. for 1 hour to obtain a suspension. Said suspension was filtered to obtain 104 parts of a wet cake. The obtained wet cake was dried to obtain 75.3 parts of a white solid.

(2) Synthesis of the following formula (23) (a mixture of No. 21, No. 22 and No. 23 in Table 1: a compound of the above formula (1) where out of four 6-membered aromatic rings of A to D, 1.5 are pyridine rings fused at the 2-position and the 3-position and the rest 2.5 are benzene rings, X is a 3-sulfoanilino group, Y is a 4-sulfoanilino group and E is ethylene)

pletely. After 80 parts of sodium chloride was added thereto and stirred for 15 minutes, the pH of the resulting liquid was adjusted to 0.7 with hydrochloric acid over 5 minutes and then said liquid was filtered to obtain 50.2 parts of a wet cake. In 440 parts of methanol, 50.2 parts of the obtained wet cake was added and then 44 parts of water was added, the resulting liquid was stirred at 50° C. for 1 hour to obtain a suspension, and said liquid was filtered to obtain a wet cake, which was washed with methanol and dried to obtain 15.5 parts of a blue powder.

λmax: 611 nm (in an aqueous solution)

Example 7

(1) Synthesis of trisodium salt of the following formula (24) (a compound of the formula (4) where X is a 2,5-disulfoanilino group, Y is a 2-carboxy-4-sulfoanilino group and E is ethylene)

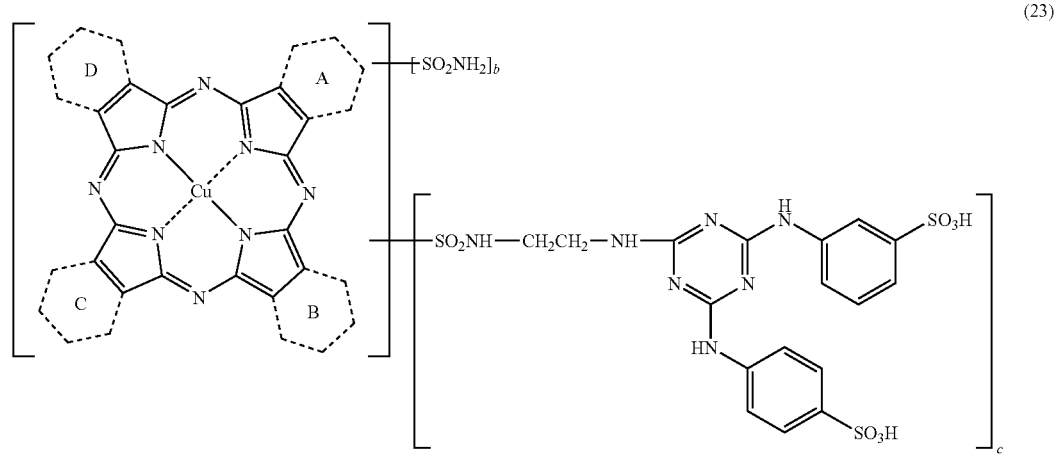

To 100 parts of ice, 40.0 parts of a wet cake of copper benzo(2,3-pyrido)porphyrazine sulfonylchloride obtained in the same manner as in Example 1-(2) was added, and then the water was added to adjust the liquid volume to 400 parts and the resulting liquid was stirred at 5° C. or less for 15 minutes to give a suspension. A solution of 14.4 parts of the compound of the formula (22) obtained in the above (1) dissolving in 100 parts of hot water and 9 parts of 28% ammonia water was added to said suspension. After the addition, the pH was adjusted to 9.0 with 28% ammonia water. While maintaining the same pH, the liquid temperature was raised to 20° C. over 10 minutes and the liquid was maintained at the same temperature for 8 hours to carry out the reaction. The liquid volume at this time was 600 parts. The resulting reaction solution was raised to 50° C. in temperature, 120 parts of sodium chloride was added thereto and stirred for 10 minutes, and then the pH of said liquid was adjusted to 1.0 with hydrochloric acid over 5 minutes followed by filtration of said liquid to obtain 76.3 parts of a wet cake. Water was added to 76.3 parts of the obtained wet cake to adjust the liquid volume to 400 parts, the liquid temperature was raised to 55° C., and the pH of said liquid was adjusted to 8.0 with a 25% aqueous sodium hydroxide solution to dissolve the wet cake com-

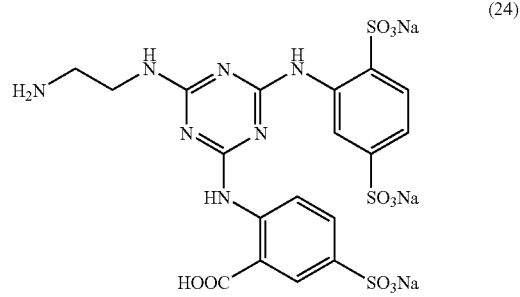

In 100 parts of ice water, 0.09 parts of LEOCOL®TD-90 (which is a trade name of a surfactant, manufactured by Lion Corporation) and 18.5 parts of cyanuric chloride were added, and the resulting liquid was stirred for 30 minutes. Next, 31.9 parts of aniline-2,5-disulfonic acid monosodium salt (purity:

90.5%) was added thereto, and while adding a 25% aqueous sodium hydroxide solution to maintain the pH of the resulting liquid at 2.7 to 3.0, the reaction was carried out at 10 to 15° C. for 1 hour and at 27 to 30° C. for 2 hours. Next, 35.4 parts of 2-amino-5-sulfobenzoic acid (purity: 67.5%) was added to said reaction solution, and while adding a 25% aqueous sodium hydroxide solution to maintain the pH of the resulting liquid at 6.0 to 7.0, the reaction was carried out at 30° C. for 3 hours. After that, the liquid temperature was raised to 60° C., 120 parts of ethylenediamine added thereto in a lump and, with the heating stopped, stirred overnight to carry out the reaction. Concentrated hydrochloric acid was added to this reaction solution to adjust to pH 9.0. Water was added thereto to adjust the liquid volume to 1,700 parts. The liquid temperature was raised to 60° C., 340 parts of sodium chloride was added thereto to precipitate a crystal, and concentrated hydrochloric acid was added thereto to adjust to pH 6.0. The precipitating crystal was separated by filtration and washed with 500 parts of a 20% aqueous sodium chloride solution. The whole volume of the obtained crystal (an aqueous wet cake) was added to 800 parts of water and a 25% aqueous sodium hydroxide solution was added thereto to adjust to pH 11. Water was further added to adjust the liquid volume to 1,000 parts and the liquid temperature was raised to 60° C. There was added 200 parts of sodium chloride to precipitate a crystal, which was then separated by filtration and washed with 500 parts of a 20% aqueous sodium chloride solution. The whole volume of the obtained crystal (an aqueous wet cake) was added in a mixed liquid of 530 parts of methanol and 27 parts of water, stirred at 60° C. for 1 hour and suspended. The crystal was separated by filtration, washed with 200 parts of methanol and dried to obtain 53.1 parts as a white powder.

(2) Synthesis of tetrasodium salt of the following formula (25) (a mixture of No. 25, No. 26 and No. 27 in Table 1: a compound of the above formula (1) where out of four 6-membered aromatic rings of A to D, 1.5 are pyridine rings fused at the 2-position and the 3-position and the rest 2.5 are benzene rings, X is a 2,5-disulfoanilino group, Y is a 2-carboxy-4-sulfoanilino group and E is ethylene)

In 100 parts of ice, 40.0 parts of a wet cake of a mixture of copper tribenzo(2,3-pyrido)porphyrazine trisulfonylchloride and copper dibenzobis(2,3-pyrido)porphyrazine disulfonylchloride obtained in the same manner as in Example 1-(2) was added, water was added to adjust the liquid volume to 400 parts, and the resulting liquid was stirred at 5° C. or less for 15 minutes to give a suspension. A solution of 13.4 parts of the compound of the formula (24) obtained in the above (1) dissolving in 100 parts of hot water was added to said suspension. After the addition, the pH was adjusted to 9.0 with 28% ammonia water. While maintaining the same pH, the liquid temperature was raised to 20° C. and the liquid was maintained at the same temperature for 22 hours to carry out the reaction. The liquid volume at this time was 580 parts. The resulting reaction solution was raised to 60° C. in temperature, and 116 parts of sodium chloride was added, stirred for 5 minutes and then adjusted to pH 1.0 with concentrated hydrochloric acid to precipitate a crystal. The crystal was separated by filtration and washed with 200 parts of a 20% aqueous sodium chloride solution to obtain 78.5 parts of a wet cake. Water was added to 78.5 parts of the obtained wet cake to adjust the liquid volume to 400 parts and the pH was adjusted to 9.0 with a 25% aqueous sodium hydroxide solution to dissolve the wet cake completely. The temperature was raised to 60° C., 80 parts of sodium chloride was added and stirred for 5 minutes, and then the pH was adjusted to 1.0 with concentrated hydrochloric acid to precipitate a crystal. The crystal was separated by filtration and washed with 200 parts of a 20% aqueous sodium chloride solution to obtain 74.9 parts of a wet cake. Water was added to 74.9 parts of the obtained wet cake to make the liquid volume 200 parts, adjusted to pH 9.0 with a 25% aqueous sodium hydroxide solution and raised to 60° C. in temperature to dissolve completely. There was added 300 parts of isopropylalcohol to deposit a blue coloring matter. The deposit was separated by

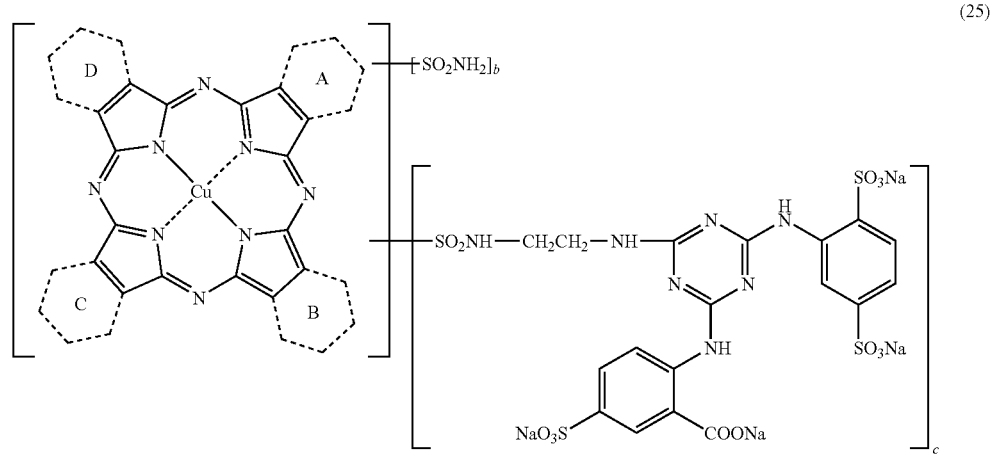

(25)

filtration, washed with 100 parts of isopropylalcohol and dried to obtain 8.7 parts of a blue powder.

λmax: 601 nm (in an aqueous solution)

Example 8

(1) Synthesis of tetrasodium salt of the following formula (26) (a compound of the formula (4) where X and Y are 5,7-disulfonaphthalen-2-ylamino groups and E is ethylene)

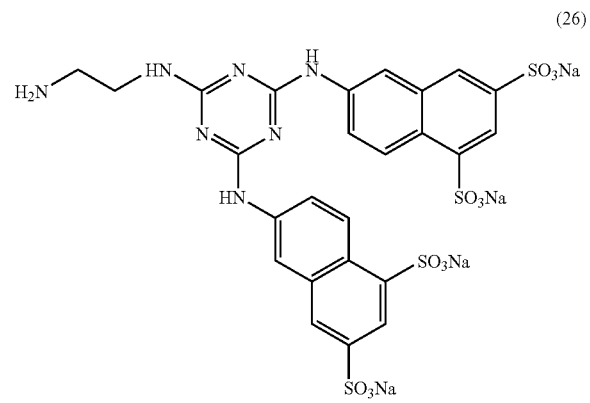

(26)

In 50 parts of ice water, 0.05 parts of LEOCOL®TD-90 (which is a trade name of a surfactant, manufactured by Lion Corporation) and 9.2 parts of cyanuric chloride were added and stirred for 30 minutes. Next, 21.9 parts of 6-aminonaphthalene-1,3-disulfonic acid (purity: 72.5%) was added, and while adding a 25% aqueous sodium hydroxide solution to maintain pH 2.7 to 3.0, the reaction was carried out at 8 to 10° C. for 1 hour. Further, 21.9 parts of 6-aminonaphthalene-1,3-disulfonic acid (purity: 72.5%) was added, and while maintaining pH 6.0 to 8.0 by addition of a 25% aqueous sodium hydroxide solution, the reaction was carried out at 8 to 10° C. for 4 hours, at 20° C. for 1 hour and at 60° C. for 30 minutes. After that, maintaining 60° C., 60 parts of ethylenediamine was added in a lump and, with the heating stopped, stirred overnight. This reaction solution was raised to 60° C. in temperature and concentrated hydrochloric acid was added to adjust to pH 1.0. The liquid volume at this time was 600 parts. After addition of 120 parts of sodium chloride, undesired substances were removed by filtration and the resulting filtrate was concentrated under reduced pressure. To the resulting residue was added 200 parts of water. There was added 25% sodium hydroxide to adjust the pH to 11.5, so that said residue was dissolved completely. Isopropylalcohol was added to this reaction solution to deposit the object, and the deposit was separated by filtration and washed with ethanol. The resulting white deposit was added in 2,000 parts of methanol and stirred for 1 hour. Insolubles were removed by filtration and ethanol was added to the obtained filtrate to deposit an objective compound. The deposit was separated by filtration, washed with ethanol and dried to obtain 30.7 parts of a white powder.

(2) Synthesis of the following formula (27) (a mixture of No. 29, No. 30 and No. 31 in Table 1: a compound of the above formula (1) where out of four 6-membered aromatic rings of A to D, 1.5 are pyridine rings fused at the 2-position and the 3-position and the rest 2.5 are benzene rings, X and Y are 5,7-disulfonaphthalen-2-ylamino groups and E is ethylene)

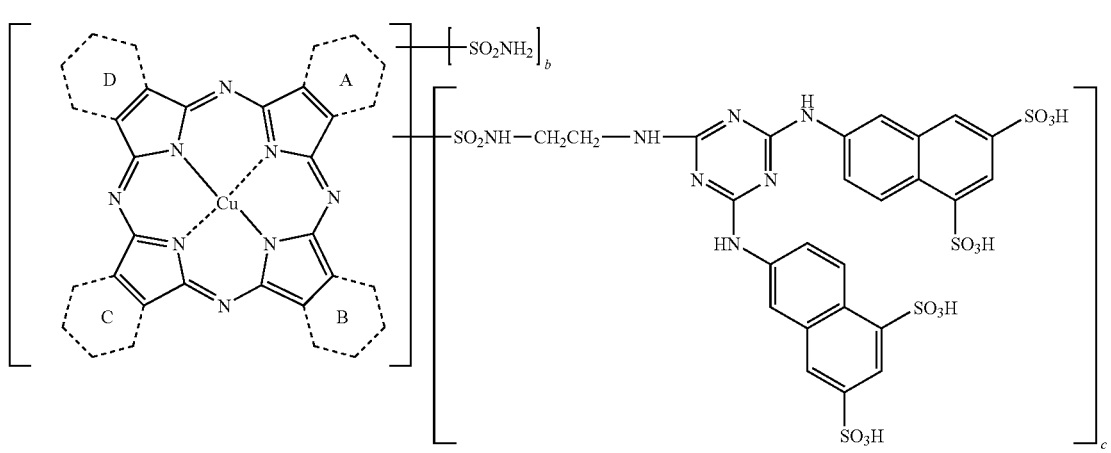

(27)

In 50 parts of ice, 40.0 parts of a wet cake of a mixture of copper tribenzo(2,3-pyrido)porphyrazine trisulfonylchloride and copper dibenzobis(2,3-pyrido)porphyrazine disulfonylchloride obtained in the same manner as in Example 1-(2) was added and water was added to adjust the liquid volume to 300 parts, and the resulting liquid was stirred at 5° C. or less for 15 minutes to give a suspension. A solution of 16.6 parts of the compound of the formula (26) obtained in the above (1) dissolving in 100 parts of hot water was added to said suspension. After the addition, the pH was adjusted to 9.0 with 28% ammonia water. While maintaining the same pH, the liquid temperature was raised to 20° C. and the liquid was maintained at the same temperature for 5 hours to carry out the reaction. The liquid volume at this time was 560 parts. The resulting reaction solution was raised to 60° C. in temperature, 112 parts of sodium chloride was added thereto and stirred for 5 minutes, and then the pH was adjusted to 1.0 with concentrated hydrochloric acid to precipitate a crystal. The crystal was separated by filtration and washed with 200 parts of a 20% aqueous sodium chloride solution to obtain 15.4 parts of a wet cake. Water was added to 15.4 parts of the obtained wet cake to adjust the liquid volume to 400 parts. The pH of said liquid was adjusted to 8.2 with a 25% aqueous sodium hydroxide solution to dissolve the wet cake completely. The liquid temperature was raised to 60° C., 80 parts of sodium chloride was added thereto and stirred for 5 minutes, and then the liquid was adjusted to pH 1.0 with concentrated hydrochloric acid to precipitate a crystal. The crystal was separated by filtration and washed with 200 parts of a 20% aqueous sodium chloride solution to obtain 16.9 parts of a wet cake. In a mixed liquid of 100 parts of methanol and 5 parts of water, 16.9 parts of the obtained wet cake was added and stirred at 60° C. for 1 hour to suspend. The suspended crystal was separated by filtration, washed with 100 parts of methanol and dried to obtain 3.7 parts of a blue powder.

λmax: 612 nm (in an aqueous solution)

Example 9

(1) Synthesis of the above formula (23) (a mixture of No. 21, No. 22 and No. 23 in Table 2: a compound of the above formula (1) where out of A, B, C and D, 1.5 are pyridine rings fused at the 2-position and the 3-position and the rest 2.5 are benzene rings, X is a 4-sulfoanilino group, Y is a 3-sulfoanilino group and E is ethylene)

To 100 parts of ice, 40.0 parts of a wet cake of a mixture of copper tribenzo(2,3-pyrido)porphyrazine trisulfonylchloride and copper dibenzobis(2,3-pyrido)porphyrazine disulfonylchloride obtained in the same manner as in Example 1-(2) was added, and water was added to adjust the liquid volume to 400 parts and stirred at 5° C. or less for 15 minutes to obtain a suspension. A solution of 4.77 parts of the compound of the formula (22) obtained in Example 6-(1) dissolving 100 parts of hot water and 3 parts of 28% ammonia water was added to said suspension. After the addition, the liquid was adjusted to pH 9.0 with 28% ammonia water. While maintaining the same pH, the liquid temperature was raised to 20° C. over 10 minutes and said liquid was maintained at the same temperature for 8 hours to carry out the reaction. The liquid volume at this time was 500 parts. The resulting reaction solution was raised to 50° C. in temperature, 100 parts of sodium chloride was added and stirred for 10 minutes, and then the pH of the resulting liquid was adjusted to 1.0 with hydrochloric acid over 5 minutes to give a precipitate, which was then separated by filtration to obtain 41.2 parts of a wet cake. Water was added to 41.2 parts of the obtained wet cake to make the liquid volume 400 parts. The liquid temperature was raised to 55° C. and the pH of said liquid was adjusted to 8.0 with a 25% aqueous sodium hydroxide solution to dissolve the wet cake completely. After 80 parts of sodium chloride was added thereto and stirred for 15 minutes, the pH of said liquid was adjusted to 4.0 with hydrochloric acid over 5 minutes to give a precipitate, which was then separated by filtration to obtain 43.2 parts of a wet cake. In 360 parts of methanol, 43.2 parts of the obtained wet cake was added, and 40 parts of water was added and stirred at 50° C. for 1 hour followed by filtration to obtain a wet cake, which was then washed with methanol and dried to obtain 8.7 parts of a blue powder (sodium salt).

λmax: 604.4 nm (in an aqueous solution)

Example 10

(1) Copper tribenzo (2,3-pyrido)porphyrazine (a compound of the above formula (8): a compound represented by the above formula (6) where out of A, B, C and D, 1 is a pyridine ring and the rest 3 are benzene rings)

In a four-neck flask, 250 parts of sulfolane, 12.3 parts of phthalimide, 15.0 parts of quinolinic acid, 72.0 parts of urea, 8.8 parts of copper chloride (II) dihydrate (purity: 97.0%) and 1.0 parts of ammonium molybdate were added, raised to 200° C. in temperature and maintained at the same temperature for 5 hours. After completion of the reaction, the liquid was cooled to 65° C. and 200 parts of methanol was added to precipitate a crystal, which was then filtered. The obtained crystal was washed with 150 parts of methanol and subsequently with 200 parts of hot water and dried to obtain 72.2 parts of a wet cake. The whole volume of the obtained wet cake was added in 500 parts of 5% hydrochloric acid, the liquid temperature was raised to 60° C. and the liquid was maintained at the same temperature for 1 hour. The crystal was separated by filtration and washed with 200 parts of water. The whole volume of the obtained wet cake was then added in 500 parts of 10% ammonia water and maintained at 60° C. for 1 hour to give a crystal, which was then separated by filtration and washed with 300 parts of water and then with 100 parts of methanol to obtain 33.6 parts of a wet cake. The obtained wet cake was dried at 80° C. to obtain 20.0 parts of copper tribenzo(2,3-pyrido)porphyrazine as a blue crystal.

λmax: 655.0 nm (in pyridine)

(2) Synthesis of copper tribenzo(2,3-pyrido)porphyrazine trisulfonylchloride (a compound of the above formula (3) where out of A, B, C and D, 1 is a pyridine ring and the rest 3 are benzene rings, and n is 3.0)

In 46.2 parts of chlorosulfonic acid, 5.8 parts of a mixture of copper tribenzo(2,3-pyrido)porphyrazine and copper dibenzobis(2,3-pyrido)porphyrazine obtained in the above (1) was gradually added at 60° C. or less while stirring, and the reaction was carried out at 140° C. for 4 hours. Next, the reaction solution was cooled to 70° C., 17.9 parts of thionyl chloride was added dropwise thereto over 30 minutes and the reaction was carried out at 70° C. for 3 hours. The reaction solution was cooled to 30° C. or less and slowly poured into 800 parts of ice water, and a precipitating crystal was separated by filtration and washed with 200 parts of cold water to obtain 40.1 parts of a wet cake of copper tribenzo(2,3-pyrido) porphyrazine trisulfonylchloride.

(3) Synthesis of the above formula (23) (a compound of the above formula (1) where out of A, B, C and D, 1 is a pyridine ring fused at the 2-position and the 3-position and the rest 3 are benzene rings, X is a 4-sulfoanilino group, Y is a 3-sulfoanilino group and E is ethylene)

To 100 parts of ice, 40.1 parts of a wet cake of copper tribenzo(2,3-pyrido)porphyrazine trisulfonylchloride obtained in the above (2) was added, water was added thereto to adjust the liquid volume to 400 parts, and the resulting liquid was stirred at 5° C. or less for 15 minutes to obtain a suspension. A solution of 4.77 parts of the compound of the formula (22) obtained in Example 6-(1) dissolving in 100 parts of hot water and 3 parts of 28% ammonia water was added to said suspension. After the addition, the pH of the resulting liquid was adjusted to 9.0 with 28% ammonia water. While maintaining the same pH, the liquid temperature was raised to 20° C. over 10 minutes and the liquid was maintained at the same temperature for 8 hours to carry out the reaction. The liquid volume at this time was 600 parts. The resulting reaction solution was raised to 50° C. in temperature, 120 parts of sodium chloride was added thereto and stirred for 10 minutes, and then adjusted to pH 1.0 with hydrochloric acid over 5 minutes to precipitate a crystal, which was then separated by filtration to obtain 46.2 parts of a wet cake. Water was added to 46.2 parts of the obtained wet cake to adjust the liquid volume to 400 parts, and then the liquid temperature was raised to 55° C. The pH of said liquid was adjusted to 8.0 with a 25% aqueous sodium hydroxide solution to dissolve the wet cake completely. After 80 parts of sodium chloride was added thereto and stirred for 15 minutes, the liquid was adjusted to pH 4.0 with hydrochloric acid over 5 minutes and then filtered to obtain 47.8 parts of a wet cake. In 360 parts of methanol, 47.8 parts of the obtained wet cake was added, 40 parts of water was added thereto and stirred at 50° C. for 1 hour, and then the resulting suspension was filtered to obtain a wet cake, which was then washed with methanol and dried to obtain 10.5 parts of a blue powder (sodium salt).

$\lambda$max: 609.9 nm (in an aqueous solution)

Example 11

Synthesis of the above formula (23) (a mixture of No. 21, No. 22 and No. 23 in Table 1: a compound of the above formula (1) where out of A, B, C and D, 1.5 are pyridine rings fused at the 2-position and the 3-position and the rest 2.5 are benzene rings, X is a 4-sulfoanilino group, Y is a 3-sulfoanilino group and E is ethylene)

To 100 parts of ice, 40.0 parts of a wet cake of a mixture of copper tribenzo(2,3-pyrido)porphyrazine trisulfonylchloride and copper dibenzobis(2,3-pyrido)porphyrazine disulfonylchloride obtained in the same manner as in Example 1-(2) was added, and water was added thereto to adjust the liquid volume to 400 parts and stirred at 5° C. or less. Fifteen minutes later, a solution of 4.77 parts of the compound of the formula (22) obtained in Example 6-(1) dissolving in 100 parts of hot water and 3 parts of 28% ammonia water was added. After the addition, the liquid was adjusted to pH 9.0 with 28% ammonia water. While maintaining the same pH, the liquid was raised to 20° C. in temperature over 10 minutes, and then maintained at the same temperature for 8 hours. The liquid volume at this time was 600 parts. The reaction solution was raised to 50° C. in temperature, and 120 parts of ammonium chloride was added, stirred for 10 minutes and then adjusted to pH 1.0 with hydrochloric acid over 5 minutes followed by filtration to obtain 46.2 parts of a wet cake. In 360 parts of methanol, 46.2 parts of the obtained wet cake was added, and 40 parts of water was added, stirred at 50° C. for 1 hour and then filtered to obtain a wet cake, which was then washed with methanol and dried to obtain 10.6 parts of a blue powder (ammonium salt).

$\lambda$max: 604.0 nm (in an aqueous solution)

Example 12

Synthesis of the above formula (23) (a compound of the above formula (1) where out of A, B, C and D, 1 is a pyridine ring fused at the 2-position and the 3-position and the rest 3 are benzene rings, X is a 4-sulfoanilino group, Y is a 3-sulfoanilino group and E is ethylene)

To 100 parts of ice, 40.1 parts of the wet cake of copper tribenzo(2,3-pyrido)porphyrazine trisulfonylchloride obtained in Example 10-(2) was added, and water was added thereto to adjust the liquid volume to 400 parts- and stirred at 5° C. or less for 15 minutes to obtain a suspension. A solution of 4.77 parts of the compound of the formula (22) obtained in Example 6-(1) dissolving in 100 parts of hot water and 3 parts of 28% ammonia water was added to said suspension. After the addition, said liquid was adjusted to pH 9.0 with 28% ammonia water. While maintaining the same pH, the liquid temperature was raised to 20° C. over 10 minutes and then maintained at the same temperature for 8 hours to carry out the reaction. The liquid volume at this time was 600 parts. The resulting reaction solution was raised to 50° C. in temperature, 120 parts of ammonium chloride was added thereto and stirred for 10 minutes, and then the pH of the resulting liquid was adjusted to 1.0 with hydrochloric acid over 5 minutes to precipitate a crystal, which was then separated by filtration to obtain 46.2 parts of a wet cake. In 360 parts of methanol, 46.2 parts of the obtained wet cake was added, and 40 parts of water was added and stirred at 50° C. for 1 hour followed by filtration to obtain a wet cake, which was washed with methanol and dried to obtain 10.6 parts of a blue powder (ammonium salt).

$\lambda$max: 607.0 nm (in an aqueous solution)

Example 13

Evaluation of Ink (A) Preparation of Ink (1) The components described in the following Table 2 were mixed and dissolved, followed by filtration with a 0.45 µm membrane filter (manufactured by Advantech Japan, Co., Ltd) to obtain an ink. In this connection, ion-exchanged water was used as water. In addition, water and caustic soda (pH adjuster) were added so that the pH of the ink was pH=8 to 10 and the total amount was 100 parts. The ink prepared using the compound of Example 1 is C-1, the ink prepared using the compound of Example 2 is C-2, and similarly each ink prepared using each compound of Examples 3 to 10 is C-3 to C-10 respectively corresponding to each number of Examples.

TABLE 2

| | |
|---|---|
| Each mixture of porphyrazine coloring matter obtained in the above Examples 1 to 10 | 5.0 parts |
| Water + caustic soda | 75.9 parts |
| Glycerine | 5.0 parts |
| Urea | 5.0 parts |
| N-methyl-2-pyrolidone | 4.0 parts |
| IPA (isopropylalcohol) | 3.0 parts |
| Butylcarbitol | 2.0 parts |
| Surfynol 104PG50 (manufactured by Nissin Chemical Industry Co., Ltd.) | 0.1 part |
| Total | 100.0 parts |

(2) The components described in the following Table 3 were mixed and dissolved, followed by filtration with a 0.45 µm membrane filter (manufactured by Advantech Japan, Co., Ltd) to obtain an ink. In this connection, ion-exchanged water was used as water. In addition, water and ammonia water (pH adjuster) were added so that the pH of the ink was pH=8 to 10 and the total amount was 100 parts. C-11 responds to the ink prepared using the compound of Example 11 and C-12 responds to the ink prepared using the compound of Example 12, respectively.

TABLE 3

| Each mixture of porphyrazine coloring matter obtained in the above Examples 11 and 12 | 5.0 parts |
| --- | --- |
| Water + ammonia water | 75.9 parts |
| Glycerine | 5.0 parts |
| Urea | 5.0 parts | the manner described in Example 3 of Patent Literature 12, inks for comparison were prepared in the same manner as in the preparation of the inks described in the above (A) so that in recording, they had the same print density as the inks of Examples 1 to 10 in Table 2. The ink prepared using the coloring matter of Comparative Example 1 is C-A, the ink prepared using the coloring matter of Comparative Example 2 is C-B and the ink prepared using the coloring matter of Comparative Example 3 is C-C. The structural formulas of the compound of the formula (101) of Comparative Example 2 and the compound of the formula (102) of Comparative Example 3 are shown below.

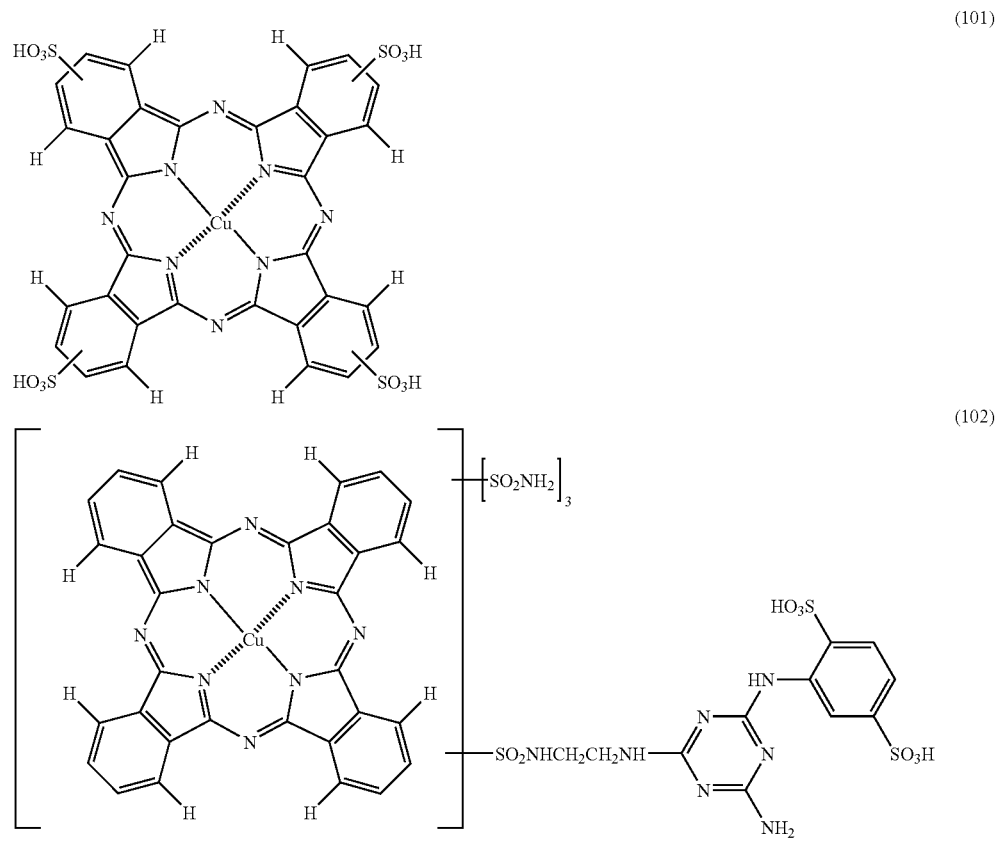

TABLE 3-continued

| N-methyl-2-pyrolidone | 4.0 parts |
| --- | --- |
| IPA (isopropylalcohol) | 3.0 parts |
| Butylcarbitol | 2.0 parts |
| Surfynol 104PG50 (manufactured by Nissin Chemical Industry Co., Ltd.) | 0.1 part |
| Total | 100.0 parts |

As Comparative Examples, using a coloring matter for inkjet recording, Projet Cyan 1 (which is a product name, manufactured by Avecia Corp.: Comparative Example 1) which is generally used as C.I.Direct Blue 199, a mixture of coloring matter (Comparative Example 2) obtained by synthesis and purification in the manner described in Example 1 of Patent Literature 8 and a coloring matter compound (Comparative Example 3) obtained by synthesis and purification in For evaluation of mixed color parts, C.I.Direct Yellow 132 was used as a coloring matter for yellow to make a yellow ink according to the composition in the following Table 4.

TABLE 4

| C.I. Direct Yellow 132 | 3.0 parts |
| --- | --- |
| Water + caustic soda | 77.9 parts |
| Glycerine | 5.0 parts |
| Urea | 5.0 parts |
| N-methyl-2-pyrolidone | 4.0 parts |
| IPA (isopropylalcohol) | 3.0 parts |
| Butylcarbitol | 2.0 parts |
| Surfynol 104PG50 (manufactured by Nissin Chemical Industry Co., Ltd.) | 0.1 part |
| Total | 100.0 parts |

For evaluation of mixed color parts, the coloring matter described in Example 3 of JP 2003-192930, namely the coloring matter of the following formula (103) was used as a coloring matter for magenta to make a magenta ink according to the composition of the following Table 5.

TABLE 5

| The coloring matter of the formula (103) | 5.0 parts |
| --- | --- |
| Water + caustic soda | 75.9 parts |
| Glycerine | 5.0 parts |
| Urea | 5.0 parts |
| N-methyl-2-pyrolidone | 4.0 parts |
| IPA (isopropylalcohol) | 3.0 parts |
| Butylcarbitol | 2.0 parts |
| Surfynol 104PG50 (manufactured by Nissin Chemical Industry Co., Ltd.) | 0.1 part |
| Total | 100.0 parts |

The structural formula of the coloring matter described in Example 3 of JP 2003-192930 is shown in the following formula (103).

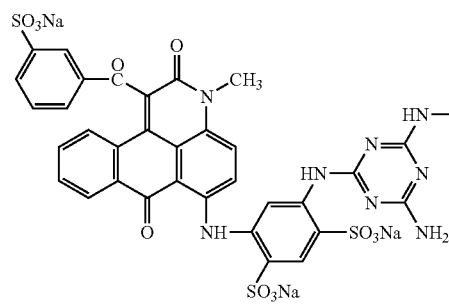
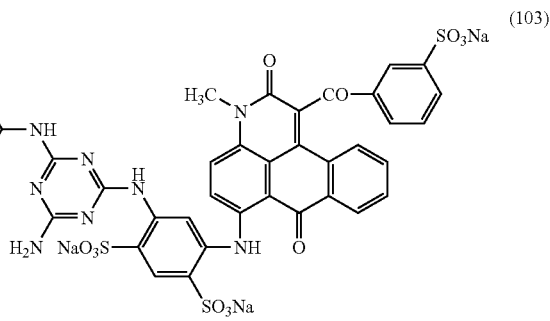

(103)

(B) Inkjet Printing

Using an ink jet printer (trade name: PIXUS ip3100, manufactured by Canon Inc.), inkjet recording was performed on two kinds of paper, glossy paper A (Advanced Photo Paper (glossy) Q7871A manufacture by Hewlett Packard Japan, Ltd.) and glossy paper B (Photo Paper (Glossy) KA420PSK manufacture by Seiko-Epson Corporation).

An image pattern was so made that six density graduations of 100%, 85%, 70%, 55%, 40% and 25% in a cyan monochrome could be obtained in printing, and half-tone printed matter was obtained. In light fastness test and ozone fastness test, a graduation part where the reflection density, D value, of the printed matter before the tests was the nearest to 1.0 was used for measurement. With regard to printing of mixed color parts, a green pattern for a mixed color with yellow and a blue pattern for a mixed color with magenta were so made that six density gradations of 100%, 85%, 70%, 55%, 40% and 25% could be obtained.

(C) Evaluation of Recorded Images

1. Hue Evaluation of Monochrome Parts

Using a calorimetric system (SectroEye, manufactured by GretagMacbeth), the recorded paper were measured on the hues of the record image, and a* and b* values when L* of the printed matter was in the range of 40 to 80 were measured. Evaluation was conducted according to three grades by defining −60 to −20 as preferable a* value and −60 to −20 as preferable b* value.

○: Both a* and b* values are in the preferable range.

Δ: Only either a* value or b* value is in the preferable range.

x: Both a* and b* values are out of the preferable range.

2. Evaluation of Mixed Color Parts

Using the above colorimetric system, comparative evaluation was conducted on C* values of mixed color parts of a cyan ink of the present invention and a yellow ink and a cyan ink of the present invention and a magenta ink. Measurement was conducted on green as a mixed color with yellow ink, namely hue (green), using a part where L* value of the printed matter is in the range of 54 to 62, and evaluation was conducted according to the following three grades using C* value of the part. Similarly, measurement was conducted on blue as a mixed color with magenta ink, namely hue (blue), using a part where L* value of the printed matter was in the range of 37 to 43, and evaluation was conducted according to the following three grades using C* value of the part.

Hue (green)

○: C* value is 75 or more.

Δ: C* value is under 75 and 70 or more.

x: C* value is under 70.

Hue (blue)

○: C* value is 63 or more.

Δ: C* value is under 63 and 60 or more.

x: C* value is under 60.

3. Light Fastness Test

Using a xenon weatherometer (model: Ci4000, manufactured by ATLAS Electric Devices Co.), the test pieces of recorded image were irradiated for 50 hours under the conditions of a illuminance of 0.36 W/m$^2$, a chamber temperature of 24° C. and a humidity of 60% RH. After the test, the reflection densities before and after the test were measured in the range of 0.70 to 0.85 of reflection density (D value), using a colorimetric system. After the measurement, the residual ratio of coloring matter was calculated by (reflection density after the test/reflection density before the test)×100(%) and evaluation was conducted according to three grades.

○: Residual ratio is 70% or more.

Δ: Residual ratio is under 70 and 50% or more.

x: Residual ratio is under 50%.

4. Ozone Fastness Test

Using an ozone weatherometer (model: OMS-H, manufactured by Suga Test Instruments Co., Ltd.), the test pieces of recorded image were left for 8 hours at an ozone concentration of 12 ppm, a chamber temperature of 24° C. and a humidity of 60% RH. After the test, reflection densities before and after the test were measured in the range of 0.70 to 0.85 of reflection density (D value), using a calorimetric system. After the measurement, the residual ratio of coloring matter was calculated by (reflection density after the test/reflection density before the test)×100(%) and evaluation was conducted according to four grades.

⊚: Residual ratio is 85% or more.

○: Residual ratio is under 85% and 70% or more.

Δ: Residual ratio is under 70% and 50% or more.

x: Residual ratio is under 50%.

5. Moisture Fastness Test

Using a thermo-hygrostat (manufactured by Ohken Co., Ltd), the test pieces of recorded image were left for 3 days at a chamber temperature of 50° C. and a humidity of 90% RH. After the test, bleeding of the test pieces was evaluated by visual observation according to three grades.

○: Bleeding is not observed.

Δ: Bleeding is slightly observed.

x: Bleeding is largely observed.

6. Evaluation of Bronze Resistance

Evaluation of bronze resistance was conducted by visual observation on the lowest level on which bronze occurred among six levels of print density 100%, 85%, 70%, 55%, 40% and 25%. OK is described on an ink causing no bronze and the lowest density among the above six grades on which bronze occurred is described on an ink causing bronze.

The results of hue evaluation, light fastness test, ozone fastness test, moisture fastness test and evaluation of bronze resistance of ink-recorded images obtained in the above Examples are respectively shown in Table 6 (glossy paper A) and Table 7 (glossy paper B).

[Table 6]

TABLE 6

| Ink Number | Hue (monochrome) | Hue (green) | Hue (blue) | Light fastness | Ozone fastness | Moisture fastness | Bronze property |
|---|---|---|---|---|---|---|---|
| C-1 | ○ | ○ | ○ | ○ | ⊚ | ○ | OK |
| C-2 | ○ | ○ | ○ | ○ | ⊚ | ○ | OK |
| C-3 | ○ | ○ | ○ | ○ | ○ | ○ | OK |
| C-4 | ○ | ○ | ○ | ○ | ○ | ○ | OK |
| C-5 | ○ | ○ | ○ | ○ | ⊚ | ○ | OK |
| C-6 | ○ | ○ | ○ | ○ | ⊚ | ○ | OK |
| C-7 | ○ | ○ | ○ | ○ | ⊚ | ○ | OK |
| C-8 | ○ | ○ | ○ | ○ | ⊚ | ○ | OK |
| C-9 | ○ | ○ | ○ | ○ | ⊚ | ○ | OK |
| C-10 | ○ | ○ | ○ | ○ | ○ | ○ | OK |
| C-11 | ○ | ○ | ○ | ○ | ⊚ | ○ | OK |
| C-12 | ○ | ○ | ○ | ○ | ⊚ | ○ | OK |
| C-A | ○ | ○ | X | ○ | X | ○ | OK |
| C-B | ○ | ○ | Δ | ○ | X | ○ | OK |
| C-C | ○ | ○ | X | ○ | ○ | ○ | OK |

[Table 7]

TABLE 7

| Ink Number | Hue (monochrome) | Hue (green) | Hue (blue) | Light fastness | Ozone fastness | Moisture fastness | Bronze property |
|---|---|---|---|---|---|---|---|
| C-1 | ○ | ○ | ○ | ○ | ⊚ | ○ | OK |
| C-2 | ○ | ○ | ○ | ○ | ⊚ | ○ | OK |
| C-3 | ○ | ○ | ○ | ○ | ○ | ○ | OK |
| C-4 | ○ | ○ | ○ | ○ | ○ | ○ | OK |
| C-5 | ○ | ○ | ○ | ○ | ⊚ | ○ | OK |
| C-6 | ○ | ○ | ○ | ○ | ⊚ | ○ | OK |
| C-7 | ○ | ○ | ○ | ○ | ⊚ | ○ | OK |
| C-8 | ○ | ○ | ○ | ○ | ⊚ | ○ | OK |
| C-9 | ○ | ○ | ○ | ○ | ⊚ | ○ | OK |
| C-10 | ○ | ○ | ○ | ○ | ○ | ○ | OK |
| C-11 | ○ | ○ | ○ | ○ | ⊚ | ○ | OK |
| C-12 | ○ | ○ | ○ | ○ | ⊚ | ○ | OK |
| C-A | ○ | ○ | Δ | ○ | X | ○ | OK |
| C-B | ○ | ○ | Δ | ○ | X | ○ | OK |
| C-C | ○ | ○ | X | ○ | ○ | ○ | OK |

As is clear from Tables 6 and 7, the cyan inks prepared using the compound of the present invention exhibited good hues in monochrome and mixed color. In particular, with regard to hue (blue) of a mixed color with a magenta ink, in the case of using glossy paper A, C* values of C-A and C-C are under 60 and C* values of C-B is under 63 and 60 or more which are the inks of Comparative Examples while C* values of C-1 to C-8 are all 63 or more which are the inks of the present invention; in the case of using glossy paper B, C* values of C-A and C-B are respectively under 63 and 60 or more and C* values of C-C is under 60 which are the inks of Comparative Examples while C* values of C-1 to C-12 are all 63 or more which are the inks of the present invention, resulting in that it is found that the ink of the present invention has higher color saturation than the inks of Comparative Examples.

In addition, in the ozone fastness test using glossy papers A and B, the residual rates of the coloring matters of C-A and C-B for Comparative Examples before and after the test are all under 50% while the residual rates of the coloring matter of C-1 to C-12 are all 70% or more even at lowest, resulting in that it is found that the ink of the present invention also has excellent ozone fastness.

As described above, it can be said that inks using the coloring matter of the present invention enable a wider range of color reproduction of printed matter and are also excellent in light fastness and moisture fastness and very excellent particularly in ozone fastness, compared with the inks of Comparative Examples.

The invention claimed is:

1. A porphyrazine coloring matter represented by the following formula (1) or a salt thereof:

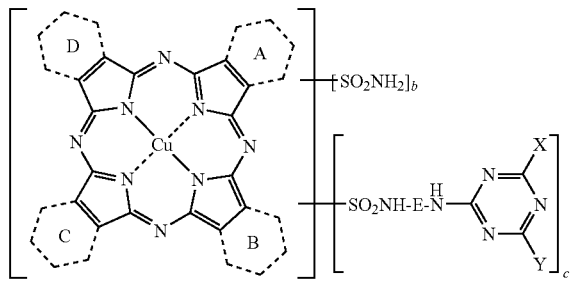

wherein, A, B, C and D independently represent a 6-membered ring having aromaticity, at least one of them represents a benzene ring, and at least one of the rest represents a nitrogen-containing heteroaromatic ring; E represents alkylene; each of X and Y independently represents a substituted or unsubstituted anilino group or a substituted or unsubstituted naphthylamino group, said anilino group may have 0 to 4 substituents of one or more kinds selected from the group consisting of a sulfo group, a carboxy group, a phosphono group, a carbamoyl group, a sulfamoyl group, a ureide group, an alkyl group, an alkoxy group, an allyloxy group, a hydroxy group, a dialkylamino group, an alkylamino group, an arylamino group, an acetylamino group, a cyano group, a nitro group, a halogen atom and a heterocycle group, said naphthylamino group may have 0 to 4 substituents of one or more kinds selected from the group consisting of a sulfo group, a carboxy group, a ureide group, an alkyl group, an alkoxy group, a hydroxy group, a dialkylamino group, an alkylamino group, an arylamino group, an acetylamino group, a cyano group, a nitro group, a halogen atom and a heterocycle group, and at least one of X and Y is an anilino group or a naphthylamino group having a sulfo group or a carboxy group as a substituent; and b is 0 to 2.9, c is 0.1 to 3, and the sum of b and c is 1 to 3.

2. The porphyrazine coloring matter or the salt thereof according to claim 1, wherein the nitrogen-containing heteroaromatic ring is a pyridine ring or a pyrazine ring.

3. The porphyrazine coloring matter or the salt thereof according to claims 1 or 2, which is obtained by reacting a porphyrazine compound represented by the following formula (3):

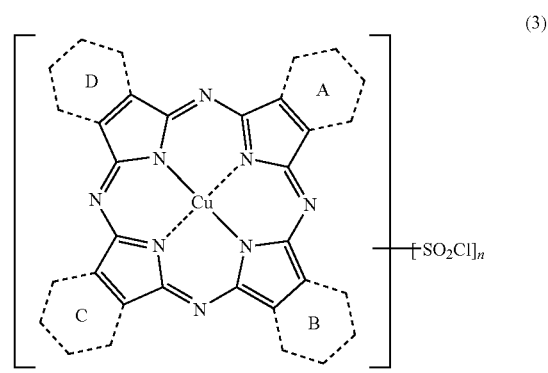

wherein, A, B, C and D have the same meanings as in the formula (1) and n is 1 to 3 with an organic amine represented by the following formula (4):

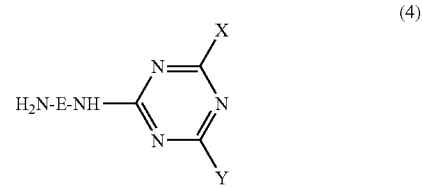

wherein, E, X and Y have the same meanings as in the formula (1) in the presence of ammonia.

4. The porphyrazine coloring matter or the salt thereof according to claim 3 characterized by being obtained in that the use amount of the organic amine represented by the formula (4) is 0.5 to 4 mol equivalent to 1 mol equivalent of the compound of the formula (3) and the reaction is carried out with the pH in the reaction system being in the range of 7 to 10.

5. The porphyrazine coloring matter or the salt thereof according to claim 2, wherein the number of the pyridine ring or the pyrazine ring corresponding to A, B, C and D is 1 to 3; E represents C2 to C4 alkylene; each of X and Y is independently an unsubstituted anilino group, a sulfo-substituted anilino group, a carboxy-substituted anilino group, a phosphono-substituted anilino group, an unsubstituted naphthylamino group, a sulfo-substituted naphthylamino group or a carboxy-substituted naphthylamino group, said substituted anilino group and said substituted naphthylamino group may have further 0 to 3 substituents of one or more kinds selected from the group consisting of a sulfo group, a carboxy group, a phosphono group, a hydroxy group, an alkoxy group, an ureide group, an acetylamino group, a nitro group and a chlorine atom; and b is 0 to 2.9, c is 0.1 to 3, and the sum of b and c is 1 to 3.

6. The porphyrazine coloring matter or the salt thereof according to claim 5, wherein E represents ethylene or propylene, each of X and Y is independently a sulfo-substituted anilino group, a carboxy-substituted anilino group or a sulfo-substituted naphthylamino group; and b is 0 to 2.9, c is 0.1 to 3, and the sum of b and c is 1 to 3.

7. The porphyrazine coloring matter or the salt thereof according to claim 1, wherein A is a pyridine ring fused at the 2-position and the 3-position or at the 3-position and the 4-position; or a pyrazine ring fused at the 2-position and the 3-position, B is a pyridine ring fused at the 2-position and the 3-position or at the 3-position and the 4-position; or a pyrazine ring fused at the 2-position and the 3-position; or a benzene ring, C is a pyridine ring fused at the 2-position and the 3-position or at the 3-position and 4-position; or a pyrazine ring fused at the 2-position and the 3-position; or a benzene ring, D is a benzene ring, and E is C2 to C4 alkylene, each of X and Y is independently an anilino group or a naphthylamino group having 1 to 3 substituents selected from the group consisting of a sulfo group, a carboxy group, a methoxy group, a nitro group, a chlorine atom and a hydroxy group, b is 0 to 2.9, c is 0.1 to 3, and the sum of b and c is 1 to 3.

8. The porphyrazine coloring matter or the salt thereof according to claim 1 represented by the following formula (2):

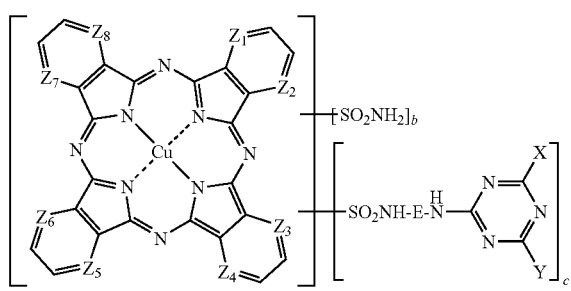

(2)

wherein, each of $Z_1$ to $Z_8$ independently represents a nitrogen atom or a carbon atom, as well as at least one of the combinations of $Z_1$ and $Z_2$, $Z_3$ and $Z_4$, $Z_5$ and $Z_6$, and, $Z_7$ and $Z_8$ is a combination of carbon atoms themselves and at least one of the rest represents a combination of a carbon atom and a nitrogen atom or a combination of nitrogen atoms themselves; and E, X, Y, b and c have the same meanings as in the formula (1).

9. The porphyrazine coloring matter or the salt thereof according to claim 8, which is obtained by reacting a porphyrazine compound represented by the following formula (5):

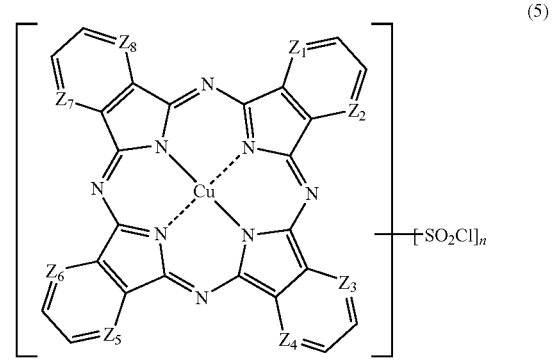

(5)

wherein, $Z_1$ to $Z_8$ have the same meanings as in the formula (2), and n is 1 to 3 with the organic amine represented by the formula (4) according to claim 3 in the presence of ammonia.

10. The porphyrazine coloring matter or the salt thereof according to claim 9 characterized by being obtained in that the use amount of the organic amine represented by the formula (4) is 0.5 to 4 mol equivalent to 1 mol equivalent of the compound of the formula (5) and the reaction is carried out in the presence of ammonia with the pH in the range of 7 to 10.

11. The porphyrazine coloring matter or the salt thereof according to claim 1, wherein A is a pyridine ring fused at the 2-position and the 3-position, B is a pyridine ring fused at the 2-position and the 3-position or a benzene ring, C is a pyridine ring fused at the 2-position and the 3-position or a benzene ring, D is a benzene ring, and E is C2 to C4 alkylene; each of X and Y is independently an anilino group or a naphthylamino group having 1 to 3 substituents selected from the group consisting of a sulfo group and a carboxy group; and b is 0 to 2.9 and c is 0.1 to 3.

12. A mixture of coloring matters containing the porphyrazine coloring matter or the salt thereof according to claim 1.

13. A mixture of coloring matters of the porphyrazine coloring matter or the salt thereof according to claim 1, and a phthalocyanine coloring matter.

14. An ink comprising the porphyrazine coloring matter or the salt thereof according to claim 1 as a coloring matter component.

15. The ink comprising the porphyrazine coloring matter or the salt thereof according to any one of claims 1, 2, 5, 7 or 11 and an organic solvent.

16. The ink according to claim 14, which is for inkjet recording.

17. An inkjet recording method characterized by utilizing the ink according to claim 14 as an ink or an ink set containing the ink in an inkjet recording method where ink drops are discharged responding to recording signals to record on a record-receiving material.

18. The inkjet recording method according to claim 17, wherein the record-receiving material is a communication sheet.

19. The inkjet recording method according to claim 18, wherein the communication sheet is a surface-treated sheet having an ink image receiving layer containing white inorganic pigment particles on the support.

20. A container containing the ink according to claim 14.

21. An ink jet printer having the container according to claim 20.

22. A colored product colored with the ink according to claim 14.

23. The porphyrazine coloring matter or the salt thereof according to claim 3, wherein the use amount of the organic amine represented by the formula (4) is 0.5 to 4 mol equivalent to 1 mol equivalent of the compound of the formula (3), the reaction is carried out in the range of pH 7 to 10 to obtain, and c of the formula (1) in claim 1 is 0.1 to 2.5.

24. The porphyrazine coloring matter or the salt thereof according to claim 8, wherein c is 0.1 to 2.5.

25. The porphyrazine coloring matter or the salt thereof according to claim 9, wherein the use amount of the organic amine represented by the formula (4) is 0.5 to 4 mol equivalent to 1 mol equivalent of the compound of the formula (5), the reaction is carried out in the range of pH 7 to 10 to obtain, and c of the formula (2) in claim 8 is 0.1 to 2.5.

26. An ink containing an organic solvent as well as a mixture of coloring matters of the porphyrazine coloring matter or the salt thereof according to any one of claims 1, 2, 5, 7 or 11 and a phthalocyanine coloring matter.

27. The porphyrazine coloring matter or the salt thereof according to claims 1, 7 or 11, wherein the porphyrazine coloring matter is the porphyrazine coloring matter according to claims 1, 7 or 11 where one or two out of A, B, C and D are nitrogen-containing heterocycles or pyridine rings and the rest are benzene rings, or a mixture of the porphyrazine coloring matter according to claims 1, 7 or 11 where one out of A, B, C and D is a nitrogen-containing heterocycle or a pyridine ring and the rest are benzene rings, and the porphyrazine coloring matter according to claims 1, 7 or 11 where two out of A, B, C and D are nitrogen-containing heterocycles or pyridine rings and the rest two are benzene rings.

* * * * *